United States Patent Office 3,810,880
Patented May 14, 1974

3,810,880
PROCESS FOR THE PREPARATION OF HUMAN ACTH AND PROTECTED HUMAN ACTH
Kalman Medzihradszky, Sandor Bajusz, Lajos Kisfaludy, Miklos Low, Zoltan Paulay, Laszlo Szporny, and Zsuzsanna Lang, Budapest, Hungary, assignors to Richter Gedeon Vegyeszeti Gyar Rt., Budapest, Hungary
No Drawing. Continuation of abandoned application Ser. No. 666,510, Sept. 8, 1967. This application Dec. 9, 1969, Ser. No. 883,660
Claims priority, application Hungary, Sept. 10, 1966, RI 306; Mar. 28, 1967, RI 317
Int. Cl. C07c *103/52*
U.S. Cl. 260—112.5     2 Claims

ABSTRACT OF THE DISCLOSURE

This invention relates to the synthetic preparation of human corticotropine and analogous biologically active polypeptides having an amino acid sequences corresponding to that of natural corticotropine.

---

This application is a continuation of application Ser. No. 666,510, filed Sept. 8, 1967 and now abandoned.

It is known that in the series of the polypeptides of adrenocorticotropic hormone (ACTH) actinity—which may be isolated from the hypophysis of different species of animals and are called corticotropines—after the isolation in pure form of the pig-, bovine- and sheep-corticotropines and the detection of the structure thereof also the isolation of the human hypophysis hormone and the clearing up of the structure of same has been carried out successfully. It has been found that all the known corticotropines consist of peptide-chains having 39 amino acids and they differ from each other only in the sequence of a nonapeptide-fragment (that of the amino acids 25–33) while the other parts of the molecules are identical:

H-Ser-Tyr-Ser-Met-Glu-His-Phe-Arg-Tyr-Gly-Lys-Pro-
$\phantom{H-}$1$\phantom{-}$2$\phantom{-}$3$\phantom{-}$4$\phantom{-}$5$\phantom{-}$6$\phantom{-}$7$\phantom{-}$8$\phantom{-}$9$\phantom{-}$10$\phantom{-}$11$\phantom{-}$12
-Val-Gly-Lys-Lys-Arg-Arg-Pro-Val-Lys-Val-Typ-Pro-
$\phantom{-}$13$\phantom{-}$14$\phantom{-}$15$\phantom{-}$16$\phantom{-}$17$\phantom{-}$18$\phantom{-}$19$\phantom{-}$20$\phantom{-}$21$\phantom{-}$22$\phantom{-}$23$\phantom{-}$24

| | |
|---|---|
| -Asp-Ala-Gly-Glu-Asp-Gln-Ser-Ala-Glu- | (A) |
| -Asp-Gly-Ala-Glu-Asp-Gln-Leu-Ala-Glu- | (B) |
| -Asp-Gly-Glu-Ala-Glu-Asp-Ser-Ala-Gln- | (C) |
| -Ala-Gly-Glu-Asp-Asp-Glu-Ala-Ser-Gln- | (D) |

$\phantom{-}$25$\phantom{-}$26$\phantom{-}$27$\phantom{-}$28$\phantom{-}$29$\phantom{-}$30$\phantom{-}$31$\phantom{-}$32$\phantom{-}$33

-Ala-Phe-Pro-Leu-Glu-Phe-OH
$\phantom{-}$34$\phantom{-}$35$\phantom{-}$36$\phantom{-}$37$\phantom{-}$38$\phantom{-}$39

(wherein (A) stands for the part-sequence 25–33 of human corticotropine and (B), (C) and (D) represent the corresponding part-sequences of pig-, bovine- and sheep-corticotropines respectively).

The abbreviations of three letters used in the peptide-formulae throughout the Specification relate to the corresponding amino acid building stones of the peptide-chains and are in full accordance with the generally accepted and used conventions of synthetic peptide chemistry.

Corticotropines isolable from the hypophysis of animals are widely used in therapy for the treatment of asthmatic and rheumatic diseases, inflammations and conditions of shock arising by serious burnings, injuries, operations and acute infectious diseases, although on a certain percentage of the patients such compositions cause allergic symptoms. Human corticotropine could not be hitherto used in therapy because the synthetic preparation thereof was not known and it was only available from human hypophysis.

It has been found that the molecule of human corticotropine illustrated by the Formula I H-Ser-Tyr-Ser-Met-Glu-His-Phe-Arg-Try-Gly-Lys-Pro-Val-Gly-
$\phantom{H-}$1$\phantom{-}$2$\phantom{-}$3$\phantom{-}$4$\phantom{-}$5$\phantom{-}$6$\phantom{-}$7$\phantom{-}$8$\phantom{-}$9$\phantom{-}$10$\phantom{-}$11$\phantom{-}$12$\phantom{-}$13$\phantom{-}$14
-Lys-Lys-Arg-Arg-Pro-Val-Lys-Val-Tyr-Pro-Asp-Ala-Gly-Glu-   (I)
$\phantom{-}$15$\phantom{-}$16$\phantom{-}$17$\phantom{-}$18$\phantom{-}$19$\phantom{-}$20$\phantom{-}$21$\phantom{-}$22$\phantom{-}$23$\phantom{-}$24$\phantom{-}$25$\phantom{-}$26$\phantom{-}$27$\phantom{-}$28
-Asp-Gln-Ser-Ala-Glu-Ala-Phe-Pro-Leu-Glu-Phe-OH
$\phantom{-}$29$\phantom{-}$30$\phantom{-}$31$\phantom{-}$32$\phantom{-}$33$\phantom{-}$34$\phantom{-}$35$\phantom{-}$36$\phantom{-}$37$\phantom{-}$38$\phantom{-}$39 may be built up by using methods of peptide-chemistry known per se, whereby the racemization of the individual amino acids making the synthesis of such long peptide-chains difficult is avoided. This may be achieved by coupling the tetradecapeptide of the Formula III $$\text{X-Ser-Tyr-Ser-Met-}\overset{\overset{OY}{|}}{Glu}\text{-His-Phe-}\overset{\overset{X'}{|}}{Arg}\text{-Try-Gly-}\overset{\overset{X}{|}}{Lys}\text{-Pro-Val-Gly-R}$$

(III)

consisting of the amino acids 1–14 of the sequence of the human corticotropine and protected in a manner known per se with the suitably protected pentacosapeptide of the Formula IV $$\text{H-}\overset{\overset{X}{|}}{Lys}\text{-}\overset{\overset{X}{|}}{Lys}\text{-}\overset{\overset{X'}{|}}{Arg}\text{-}\overset{\overset{X'}{|}}{Arg}\text{-Pro-Val-}\overset{\overset{X}{|}}{Lys}\text{-Val-}\overset{\overset{Y}{|}}{Tyr}\text{-Pro-}\overset{\overset{OY}{|}}{Asp}\text{-Ala-Gly-}$$

(IV)

$$-\overset{\overset{OY}{|}}{Glu}\text{-}\overset{\overset{OY}{|}}{Asp}\text{-Gln-Ser-Ala-}\overset{\overset{OY}{|}}{Glu}\text{-Ala-Phe-Pro-Leu-}\overset{\overset{OY}{|}}{Glu}\text{-Phe-OY}$$

consisting of the amino acids 15–39 of the sequence of human corticotropine by coupling-methods of the peptide chemistry known per se (wherein X and Y stand for protective groups which may be removed in the same way, such as tert. butyloxycarbonyl or tert. butyl groups, R is a hydroxy group or a substituent suitable for the activation of the carboxy group, generally used in peptide-chemistry for such purposes, e.g. an azide, nitrophenoxy or chlorophenoxy group; and X' represents a substituent suitable for the protection of the guanidino group, such as a nitro group or a proton, protecting the guanidino group).

The starting material of the present synthesis, i.e. the protected tetradecapeptide of the Formula III is a new compound never described in literature. This compound may be easily prepared, it is highly insoluble and may be consequently readily isolated in pure form. The particular advantage of said compound used in the process of the present invention resides in the fact that it contains as C-terminal amino acid the glycine-residue which is not subjected to the danger of racemization by coupling. Therefore the protected tetradecapeptide of the Formula III may be used according to the present invention not only for the preparation of human corticotropine of the Formula I, but it may be also applied very advantageously as starting material for the synthesis of analogous biologically active polypeptides consisting of shorter part-sequences of natural corticotropine. It is known that polypeptides containing the fragment 1–13 of natural corticotropine in the same form, but consisting only of a part of the complete amino acid chain of natural corticotropine—particularly the tetracosa- and octacosapeptides consisting of the first 24 and 28 amino acids of natural corticotropine respectively—exhibit highly valuable hormonal effects being quite similar to those of natural corticotropine. Moreover said shorter fragments containing however the first 1–13 amino acids of natural corticotropine possess other therapeutically useful properties too (e.g. lipoid mobilizing effects), which may be observed also by shorter fragments which exert only a weak adrenocorticotropic effect or do not exhibit such effect at all.

Said valuable corticotropine fragments may also be prepared in a very advantageous manner with high yields and without racemization according to the present invention, by coupling the appropriately protected tetradecapeptide of the Formula III with a suitably protected peptide of the general Formula V

H—Q'—T' (V)

containing the remaining part of the desired polypeptide end-product by methods of peptide-chemistry known per se (wherein T' stands for an amino, alkoxy or aryloxy group and Q' is an amino acid radical chain appropriately protected on the reactive side-groups, said amino acid radical chain completing the amino acid sequence of the tetradecapeptide of the Formula III to the desired natural human or animal corticotropine or corticotropine fragment.

According to the present invention there is provided a process for the synthetic preparation of human corticotropine of the Formula IIA H-Ser-Tyr-Ser-Met-Glu-His-Phe-Arg-Try-Gly-Lys-Pro-
  1   2   3   4   5   6   7   8   9  10  11  12
-Val-Gly-Lys-Lys-Arg-Arg-Pro-Val-Lys-Val-Tyr-Pro- (IIA)
 13  14  15  16  17  18  19  20  21  22  23  24
-Asp-Ala-Gly-Glu-Asp-Gln-Ser-Ala-Glu-Ala-Phe-Pro-
 25  26  27  28  29  30  31  32  33  34  35  36
-Leu-Glu-Phe-OH
 37  38  39 hitherto never produced synthetically and the analogous pig-, bovine- and sheep-corticotropines having the amino acid sequence (IIB), (IIC) or (IID) respectively -Asp-Gly-Ala-Glu-Asp-Gln-Leu-Ala-Glu (IIB)
 25  26  27  28  29  30  31  32  33
-Asp-Gly-Glu-Ala-Glu-Asp-Ser-Ala-Gln- (IIC)
 25  26  27  28  29  30  31  32  33
Ala-Gly-Glu-Asp-Asp-Glu-Ala-Ser-Gln- (IID)
 25  26  27  28  29  30  31  32  33 in the nonapeptide fragment (25–33) and also of the fragments thereof of the general Formula VI H-Ser-Tyr-Ser-Met-Glu-His-Phe-Arg-
            Try-Gly-Lys-Pro-Val-Gly-Q-T (VI)

containing at least the first 15 amino acids of the above sequences (IIA)–(IID) (wherein T stands for a hydroxy or amino group and Q represents one of the amino acid sequence (15–39) of (A) Lys(X)-Lys(X)-Arg(X')-Arg(X')-Pro-Val-
  Lys(X)-Val-Tyr(Y)-Pro-Asp(OY)-Ala-Gly-
  Glu(OY)-Asp(OY)-Gln-Ser-Ala-Glu(OY)-Ala-Phe-
  Pro-Leu-Glu(OY)-Phe-
(B) -Lys(X)-Lys(X)-Arg(X')-Arg(X')-Pro-Val-
  Lys(X)-Val-Tyr(Y)-Pro-Asp(OY)-Gly-Ala-
  Glu(OY)-Asp(OY)-Gln-Leu-Ala-Glu(OY)-Ala-
  Phe-Pro-Leu-Glu(OY)-Phe-
(C) -Lys(X)-Lys(X)-Arg(X')-Arg(X')-Pro-Val-Lys(X)-
  Val-Tyr(Y)-Pro-Asp(OY)-Gly-Glu(OY)-Ala-
  Glu(OY)-Asp(OY)-Ser-Ala-Gln-Ala-Phe-Pro-Leu-
  Glu(OY)-Phe-
(D) -Lys(X)-Lys(X)-Arg(X')-Arg(X')-Pro-Val-
  Lys(X)-Val-Tyr(Y)-Pro-Ala-Gly-Glu(OY)-Asp(OY)-
  Asp(OY)-Glu(OY)-Ala-Ser-Gln-Ala-Phe-Pro-Leu-
  Glu(OY)-Phewherein X, X' and Y stand for hydrogen atoms or any fragment of the above sequences (A)–(D) beginning with the above initial group -Lys(X)- and consisting of 1 to 24 amino acid radicals) which comprises coupling the tetradecapeptide of the Formula III

```
              OY       X'      X
              |        |       |
X-Ser-Tyr-Ser-Met-Glu-His-Phe-Arg-Try-Gly-Lys-Pro-Val-Gly-R
                                                          (III)
``` consisting of the amino acids 1–14 of the sequence of natural corticotropines and protected in a manner known per se (wherein X and Y stand for protective groups which can be removed in the same way; X' represents a substituent suitable for the protection of the guanidino group or for hydrogen and R stands for a hydroxy group or for a substituent activating the carboxy group) with a suitably protected peptide of the general Formula V

H—Q'—T' (V)

consisting of the further amino acids of the desired corticotropine or corticotropone-fragment (wherein T' stands for an amino, alkoxy or aryloxy group and Q' stands for an aminoacid sequence according to the definition of Q given above but wherein the symbols X, X' and Y represent the protective groups mentioned in the definition of Formula III), according to coupling methods of peptide-chemistry known per se to yield the desired corticotropine or corticotropine-fragment and splitting off the protective groups in the peptide thus obtained by methods known per se.

The process of the present invention is carried out by condensing a protected tetradecapeptide of the Formula III with the other peptide-component of the general Formula V according to any known coupling-method of peptide-chemistry (e.g. by using the azide-method, forming a mixed anhydride or an active ester, or with the aid of a carbodiimide). Although the coupling-reaction may be accomplished in principle by all the known coupling-methods, it has been found that particularly high yields may be achieved and considerably purer and more easily isolable products can be obtained by carrying out the condensation with a carbodiimide, particularly by using dicyclohexylcarbodiimide, in the presence of a hydroxy compound, preferably pentachlorophenol.

The desired end-products are obtained in yields amounting to about 60%. If the components are used in equimolar ratio, the reaction mixture contains practically no unreacted starting material and the reaction products obtained in a purer form can be isolated in a considerably simpler way.

The protected peptides obtained by condensing the protected tetradecapeptide of the Formula II with a compound of the Formula V may be converted into the peptides bearing free functional groups by splitting off the protective groups according to methods known per se. The free peptides thus obtained may be used in therapy after a suitable purification in the form of the free peptide, or a salt thereof, or if desired in the form of a complex formed with metal salts, or an addition product formed with gelatine or with human serum proteins, or a condensate thereof prepared with reducing sugars.

The starting materials used in the process of the present invention—i.e., the protected tetradecapeptide of the Formula III and the protected peptide-fragments of the general Formula V—may be prepared according to methods of peptide-chemistry known per se by using protective group combinations also known per se. In accordance with general principles of the synthesis of peptides it is preferred to use protective groups which may be removed at the end of the synthesis by mild acidic hydrolysis (e.g. by using tert. butyloxycarbonyl groups for the protection of amino groups and tert. butylester or tert. butylether groups for protecting carboxy or hydroxy groups); however in the preparation of intermediate products carbobenzoxy and p-chloro-carbobenzoxy groups may be used as well and the guanidino-group of arginine may be protected preferably with the aid of nitro groups. The synthesis may also be carried out by using arginine bearing no special protective groups, only a protionized guanidino group.

If the component to be activated is an acylamino acid or an acyl-peptide containing proline or glycine as C-terminal amino acid, the peptide-compounds may also be formed by using the methods of mixed anhydrides, active esters or carbodiimides. In all the other cases, i.e., if racemization of the activated amino acid must be taken into account, it is preferable to use the azide-method, either with an isolated or with a non-isolated azide in aqueous medium or in an organic solvent.

In the preparation of the protected tetradecapeptide (1–14) of the Formula III one may proceed preferably by converting the tetrapeptide-ester Z-Lys(BOC)-Pro-Val-Gly-OC$_2$H$_5$ described in literature first into the protected hexapeptide-esters Z-Try - Gly - Lys(BOC)-Pro-Val-Gly-OC$_2$H$_5$ and then transforming said product into the heptapeptide H-Arg-Try-Gly-Lys(BOC)-Pro-Val-Gly-OH by coupling with protected arginine and removing the C- and N-terminal protective groups. The heptapeptide is first acylated with the protected tripeptideazide Z-Glu(OBu$^t$)-His-Phe-N$_3$ and the decapeptide thus obtained is acylated after removal of the N-terminal protective group with the protected tetrapeptide-azide BOC - Ser - Tyr-Ser-Met-N$_3$. Thus the tetradecapeptide (1–14) of the Formula BOC-Ser-Tyr-Ser-Met-Glu(OBu$^t$)-His-Phe-Arg-Try-Gly-Lys(BOC)-Pro-Val-Gly-OH protected on the N-terminal group and on the side-chains is obtained.

The pentacosapeptide (15–39) may be prepared preferably by condensing the known peptide H-Glu(OBu$^t$)-Ala-Phe-Pro-OH with the known peptide Z-Ser-Ala-N$_3$, subjecting the product obtained to hydrogenolysis to yield the new hexapeptide H-Ser-Ala-Glu(OBu$^t$)-Ala-Phe-Pro-OH and converting said product into the heptapeptide Z-Gln-Ser-Ala-Glu(OBu$^t$)-Ala-Phe-Pro-OH being a new compound as well. Said protected heptapeptide is coupled with the known tripeptide-ester H-Leu-Glu(OBu$^t$)-Phe-OBu$^t$ to yield the new decapeptide Z-Gln-Ser-Ala-Glu(OBu$^t$)-Ala-Phe-Pro-Leu-Glu(OBu$^t$)-Phe-OBu$^t$. This product is acylated first with aspartic acid, then with protected glutamic acid, whereby the corresponding new undeca- and dodecapeptide are obtained respectively. The dodecapeptide is coupled with the new tripeptide Z-Asp(OBu$^t$)-Ala-Gly-OH to yield a new pentadecapeptide, which is then acylated with the new protected decapeptide prepared by condensation of the pentapeptides Z - Lys(BOC) - Lys(BOC)-Arg(NO$_2$)-Arg(NO$_2$)-Pro-OR (wherein R stands for a p-nitro-phenyl or pentachlorophenyl radical) and H-Val-Lys(BOC) - Val - Tyr(Bu$^t$) - Pro - OH. The protected pentacosapeptide thus obtained is then converted into the hitherto unknown pentacosapeptide-derivative of the Formula IV (wherein X=BOC, Y=Bu$^t$ and X'=H) by hydrogenolysis.

One may also proceed by coupling the above-mentioned dodecapeptide with the new octapeptide prepared by reacting the pentapeptide Z-Val-Lys(BOC)-Val-Tyr(Bu$^t$)-Pro-OR' (wherein R' stands for an activating group, e.g. a succinimido radical —Su) with the new tripeptide H-Asp(OBu$^t$)-Ala-Gly-OH, thus obtaining the new eicosapeptide Z - Val-Lys(BOC)-Val-Tyr(Bu$^t$)-Pro-Asp(OBu$^t$)-Ala - Gly - Glu - (OBu$^t$) - Asp(OBu$^t$) - Gln - Ser - Ala-Glu - (OBu$^t$) - Ala - Phe - Pro - Leu - Glu(OBu$^t$) - Phe-Obu$^t$. The N-terminal protective group is removed and the product is coupled with the above-mentioned pentapeptide, whereby the already mentioned protected pentacosapeptide is obtained. This product is converted into the desired component (15–39) of the Formula IV (X=BOC, Y=Bu$^t$, X'=H) by means of hydrogenolysis.

The amino-components required for the synthesis of the tetradeca-, pentadeca- and hexadecapeptides (1–14), (1–15) and (1–16) are known compounds. The amino-components (15–17) and (15–18) used in the synthesis of the heptadeca- and octadecapeptides (1–17) and (1–18) respectively may be prepared by condensing the Z - Lys(BOC) - Lys(BOC) - N$_3$ with H - Arg(NO$_2$)-NH$_2$ or H-Arg(NO$_2$) - Arg(NO$_2$) - NH$_2$ respectively. In the preparation of the amino-components used in the synthesis of the nonadecaoctacosapeptides/(1–19) to (1–28)/ the protected active pentapeptide-ester Z-Lys(BOC)-Lys(BOC)-Arg(NO$_2$)-Arg(NO$_2$)-Pro-OR$_2$ (wherein R' is a radical capable of forming an active ester, such as p-nitro-phenyl or pentachlorophenyl) may be used as common starting material. This compound is reacted in the synthesis of the nonadecapeptide (1–19) with ammonia and in all the other cases with the corresponding, appropriately protected amino acid or peptide derivatives. The amino-component used in the synthesis of the octacosapeptide (1–28) may be prepared accordingly from the above-mentioned protected active pentapeptide-ester by acylating the nonapeptide derivative H-Val-Lys(BOC)-Val-Tyr(OBu$^t$)-Pro-Asp(Bu$^t$)-Gly-Ala-Glu(OBu$^t$)-OBu$^t$ with the protected active pentapeptide-ester. Said nonapeptide derivative may be obtained by condensing the Z-Val-Lys(BOC)-Val-Tyr(Bu$^t$)-Pro-OR' (wherein R' is a radical capable of forming an active ester, such as the N hydroxysuccinimide radical) with the H-Asp(OBu$^t$)-Gly-Ala-Glu(OBu$^t$)-OBu$^t$.

Generally in the literature extremely complicated methods (such as ion exchange chromatography, electrophoresis or counter current-distribution) are proposed for the purification of non-crystallizable polypeptides having long peptide-chains. According to the new synthesis of the present invention as a result of the suitable selection of the intermediate products the above complicated purifying methods may be eliminated. According to the present process intermediate products having various structures and even the protected end products may be isolated in pure form by means of a single generally applicable purification procedure comprising a simple chromatographic separation on a silica gel column. The scale of the chromatographic step may be increased at discretion, thus said method may also be used successfully for the preparation of larger amounts of the polypeptides. The products provided by the chromatographic separation of the protected polypeptides on silica gel are of such purity, that after removing the protective groups the free peptides may be obtained in chromatographically pure form without further purification.

The process of the present invention is illustrated by the following examples; it is however by no means intended to limit the scope of the invention to the specific examples. The intermediate and end-products in the examples are designated by the abbreviation generally used in peptide-chemistry. In addition to the above abbreviations of the amino acid residues the following abbreviated expressions are used for the protective groups:

Z=carbobenzyloxy—(C$_6$H$_5$CH$_2$OCO—)
BOC=tert. butyloxycarbonyl—(/CH$_3$/$_3$COCO—)
Bu$^t$=tert. butyl—(C/CH$_3$/$_3$—)
NB=p-nitro-benzyl—
NP=p-nitro-phenyl—
PCP=pentachlorophenyl—

By the identifying data disclosed in the examples the chromatographic R$_f$ values relate to different solvent-systems; the numbers indicated beside the symbol "R$_f$" refer to the following solvent-systems:

1: Ethylacetate-pyridine-acetic acid-water—60:20:6:11
2: Ethyl acetate-pyridine-acetic acid-water—60:10:3:5.5
3: Chloroform-methanol-water—60:38:10
4: Chloroform-methanol—90:10
5: Ethyl acetate-pyridine-formic acid-water—40:20:6:5.5
6: Butanol-pyridine-acetic acid-water—30:20:6:24
7: Ethyl acetate-pyridine-formic acid-water—60:20:6:5.5
8: Chloroform-methanol-water—40:10:1
9: Chloroform-methanol-water—60:26:5
10: Chloroform-methanol—80:15
11: Chloroform-methanol—80:20
12: Ethyl acetate-pyridine-acetic acid-water—240:20:6:11

EXAMPLE 1

Synthesis of Human Corticotropine

Step 1: Z-Ser-Ala-Glu-(OBu$^t$)-Ala-Phe-Pro-OH (31–36)

3.6 g. (11.1 millimoles) of the protected dipeptide-hydrazide Z-Se-Ala-N$_2$H$_3$ (see J. I. Harris, J. S. Fruton: J.

Biol. Chem. 191, 143 (1951)) are suspended in 36 ml. of dimethylformamide, the suspension is admixed with 5.55 ml. of 6 N hydrochloric acid at −30° C. and the temperature is slowly raised. The suspended substance is dissolved at about −20° C. The solution is cooled to under −30° C. and admixed dropwise with 2.2 ml. of a molar sodium nitrite solution. The reaction mixture is stirred at a temperature between −20° C. and −30° C. for 15 minutes, whereupon the aqueous solution of the amino-component is added; this solution is prepared by dissolving 4.92 g. of the free tetrapeptide Glu(OBu$^t$)-Ala-Phe-Pro (9.5 millimoles) in 20 ml. of water containing 1.33 ml. (9.5 millimoles) of triethylamine (see S. Bajusz, T. Lázár: Acta Chim. Hung. 48, 111/1966/). After admixture of the two solutions the temperature is allowed to rise slowly to 0° C. and the mixture is allowed to stand overnight. The solution is acidified with citric acid to the value of pH=3, whereupon the resulting hexapeptide precipitates. Thus 5.65 g. of the hexapeptide are obtained (73.5% of the theoretical yield). M.P.: 172–173° C.; $R_f^2$ 0.23–0.33; $R_f^1$ 0.65–0.75.

Step 2: Ser-Ala-Glu(OBu$^t$)-Ala-Phe-Pro-OH (31–36)

5.8 g. (7.15 millimoles) of the protected hexapepetide prepared according to step 1 are dissolved in 100 ml. of an 80% acetic acid solution and hydrogenated in the presence of a palladium-charcoal catalyst. The advancement of the reaction is controlled by means of chromatography. After completion of the reaction the catalyst is filtered off, the solution is evaporated, the residue is admixed with methanol and evaporated again. The crystalline product precipitates from the methanolic solution of the residue. The thick crystal-suspension obtained is diluted with ether, the crystals are filtered, washed with ether and dried. Thus 4.3 g. of the free hexapeptide are obtained (yield: 89%); M.P.: 200–202° C.; $R_f^1$ 0.15–0.20.

Step 3: Z-Gln-Ser-Ala-Glu(OBu$^t$)-Ala-Phe-Pro-OH (30–36)

4.3 g. (6.35 millimoles) of the free hexapeptide prepared according to step 2, 0.45 ml. (6.35 millimoles) of triethylamine and 2.81 g. (7.0 millimoles) of carbobenzoxyglutamine-p-nitrophenyl-ester are dissolved in 13.0 ml. of pyridine at 50° C. The reaction-mixture is allowed to stand for a day, whereupon the gel-like reaction-product obtained is triturated with ether, then with citric acid and finally crystallized from methanol. Thus 4.65 g. of the protected heptapeptide are obtained (yield: 78%); M.P.: 188–190° C., $R_f^1$ 0.45–0.52.

Step 4: Z-Gln-Ser-Ala-Glu(OBu$^t$)-Ala-Phe-Pro-Leu-Glu(OBu$^t$)-Phe-OBu$^t$ (30–39)

3.95 g. (6.06 millimoles) of the protected tripeptide-ester Z-Leu-Glu(OBu$^t$)-Phe-OBu$^t$ (see S. Bajusz, T. Lázár: Acta Chim. Hung. 48, 111 (1966) are dissolved in 50 ml. of methanol and hydrogenated in the presence of a palladium-charcoal catalyst. The reaction having been completed the catalyst is filtered off and the filtrate is evaporated. The residual oil is dissolved in 4 ml. of dimethylformamide and the solution is added to the solution of the mixed component, prepared as follows.

4.55 g. (4.84 millimoles) of the protected heptapeptide prepared according to step 3 are dissolved in 25 ml. of dimethylformamide, the solution is admixed with 0.675 ml. (4.82 millimoles) of triethylamine and cooled to −30° C. 0.49 ml. (about 4.9 millimoles) of ethyl chloroformate are added dropwise to the cooled solution, the mixture is stirred at −20° C. for 10 minutes and then admixed with the solution of the amino-component (the preparation of the amino component is described above). The mixture is allowed to stand overnight, admixed with 0.5 ml. of triethylamine and diluted with about 100 ml. of water. The precipitated product is filtered, washed with water until neutral, dried, washed with ether, dissolved in a warm mixture of 100 ml. of methanol and 70 ml. of water and the solution is allowed to stand for crystallization. The product obtained is filtered, washed with a 60% aqueous methanol solution and dried. Thus 5.9 g. (yield: 84%) of the protected decapeptide are obtained. M.P.: 213–124° C. $R_f^4$ 0.23–0.30, $R_f^{12}$ 0.28–0.35.

Step 5: Z-Asp(OBu$^t$)-Gln-Ser-Ala-Glu(OBu$^t$)-Ala-Phe-Pro-Leu-Glu(OBu$^t$)-Phe-OBu$^t$ (29–39)

6.48 g. (4.5 millimoles) of the protected decapeptide prepared according to step 4 are dissolved in 200 ml. of dimethylformamide, the solution is admixed with 4.5 ml. of N hydrochloric acid and hydrogenated in the presence of a palladium-charcoal catalyst. After completion of the reaction the catalyst is filtered off, the filtrate is evaporated and the residue is triturated with a mixture of ether and pertoleum ether, washed with the same mixture and dried. Thus 5.62 g. of the free decapeptide-hydrochloride are obtained (yield: 87%); $R_f^5$ 0.12–0.23.

The free decapeptide-hydrochloride prepared as described above (4.03 millimoles) is dissolved in 12.5 ml. of dimethylformamide, admixed with 0.565 ml. (4.03 millimoles) of triethylamine, then with 2.7 g. (6.05 millimoles) of α-carbobenzoxy-β-tert. butyl-aspartic acid-p-nitro-phenyl-ester and allowed to stand at 50° C. for 40 hours. The reaction-mixture is triturated with ether, the precipitated crude product is filtered, washed with ether and dissolved in 130 ml. of ethanol. The solution is treated with activated charcoal, filtered off, the activated charcoal is washed on the filter with 26 ml. of hot methanol and the united methanolic filtrates are diluted with 105 ml. of hot water. The precipitated product is filtered off, washed and precipitated once more from 130 ml. of methanol and 100 ml. of water. Thus 4.9 g. of the protected undecapeptide are obtained (yield: 75.5%); M.P.: 211–213° C.; $R_f^{12}$ 0.4–0.45; $R_f^4$ 0.27–0.33.

Step 6: Z - Glu(OBu$^t$) - Asp(OBu$^t$) - Gln - Ser - Ala-Glu(OBu$^t$) - Ala - Phe-Pro-Leu-Glu(OBu$^t$)-Phe-OBu$^t$ (28–29)

4.6 (2.85 millimoles) of the protected undecapeptide prepared according to step 5 are hydrogenated in 250 ml. of 80% acetic acid in the presence of a palladium-charcoal catalyst. The reaction having been completed the catalyst is filtered off, the filtrate is evaporated, the residue is triturated with ether, filtered and dried. Thus 4.25 g. of the undecapeptide free on the N-terminal are obtained (yield: 97%). This product is admixed with 2.1 g. (4.5 millimoles) of α-carbobenzoxy-γ-tert. butyl-glutamic acid-p-nitro-phenyl-ester at 50° C. within 20 hours in 10 ml. of dimethylformamide. The reaction-mixture is triturated with ether, filtered, the precipitate is washed with ether and dried. The crude product thus obtained is warmed with 20 ml. of a mixture of ethyl acetate, pyridine, acetic acid and water (60:10:3:5), whereupon it is cooled with ice-water. The precipitated gel-like product is filtered, washed twice with 2 ml. of the above solvent-mixture each, then with water and dried. Thus 3.48 g. of the protected dodecapeptide are obtained (yield: 70%). M.P.: 201–203° C.; $R_f^{12}$ 0.46–0.53; $R_f^4$ 0.47–0.52.

Step 7: H - Glu(OBu$^t$) - Asp(OBu$^t$) - Gln - Ser - Ala-Glu(OBu$^t$) - Ala - Phe - Pro - Leu-Glu(OBu$^t$)-Phe-OBu.HCl (28–39)

2.34 g. (1.3 millimoles) of the protected dodecapeptide prepared according to step 6 are dissolved in 20 ml. of dimethylformamide containing 1.3 ml. of N hydrochloric acid. The mixture is hydrogenated in the presence of a palladium-charcoal catalyst. The reaction having been completed the catalyst is removed by filtration, the filtrate is evaporated, the residue is triturated with about 10 ml. of a 15% sodium chloride solution, filtered, washed with a small amount of cold water and dried. Thus 2.11 g. of the free dodecapeptide-hydrochloride are obtained (yield: 95.5%); $R_f^{10}$ 0.48–0.53; $R_f^4$ 0.06–0.15.

Step 8: Z-Ala-Gly-ONB (26–27) (NB=p-nitro-benzyl 2.80 g. (9.65 millimoles) of H-Gly-ONB.HBr (see H. Schwarz, K. Arakawa: J. Am. Soc. 81, 5681/1959/) are suspended in a mixture of 5 ml. of water and 15 ml. of ethyl acetate, whereupon the suspension is shaken at 0° C. with 15 ml. of a coldly saturated potassium carbonate solution. The layers are separated, the aqueous phase is extracted twice with ethyl acetate, the ethyl acetate extracts are united, dried and evaporated at room temperaure in vacuo. Thus 2.0 g. of the crystalline free glycine-p-nitrobenzyl-ester are obtained (yield: 100%), which may be used for the further steps of the synthesis without recrystallization.

2.0 g. (9.5 millimoles) of glycine-p-nitro-benzyl-ester and 2.13 g. (9.5 millimoles) of carbobenzoxy-alanine are dissolved in 20 ml. of methyl chloride. The solution is cooled to 0° C. and admixed with a solution of 1.96 g. (9.5 millimoles) of dicyclohexyl-carbodidiimide and 4 ml. of methylene chloride. The mixture is stirred at 0° C. for an hour and at room-temperature for a further hour, whereupon it is allowed to stand overnight. The dicyclohexyl-urea (2.0 g.; yield: 94%) is removed by filtration, the filtrate is washed successively with diluted hydrochloric acid, water, a 5% sodium hydrogen carbonate solution and water, then dried and evaporated. The residue is crystallized from a mixture of 20 ml. of ethyl acetate and 20 ml. of petroleum ether. The protected dipeptide-ester thus obtained (3.50 g.) is crystallized once more from a mixture of methanol and water. Thus 3.0 g. of the protected dipeptide-ester are obtained (yield: 76%). M.P.: 104–106° C.; $R_f^7$ 0.5–0.6.

Analysis.—$C_{20}H_{21}O_7N_3$ (415.396). Calc. (percent): C, 57.80; H, 51.10; N, 10.10. Found (percent): C, 57.9; H, 5.4; N, 10.1.

Step 9: H-Ala-Gly-ONB.HBr (26–27)

4.0 g. (9.6 millimoles) of the protected dipeptide-ester prepared according to step 8 are dissolved in 5 ml. of ethyl acetate and admixed with 15 ml. of an about 4 N hydrobromic acid solution formed with glacial acetic acid. The mixture is allowed to stand at room temperature until the foaming is stopped (about 1 hour). The product is precipitated by addition of ether, whereupon it is filtered, washed with ether and dried. The crude product thus obtained (3.30 g.) is recrystallized from 20 ml. of ethanol. Thus 3.0 g. of the free dipeptide-ester are obtained. (Yield: 86%). $R_f^1$ 0.6–0.7.

Analysis.—$C_{12}H_{15}O_5N_3$.HBr (363.188). Calc. (percent): C, 39.80; H, 4.45; N, 11.61; Br, 22.05. Found (percent): C, 40.1; H, 4.8; N, 11.6; Br, 22.25.

Step 10: Z-Asp(OBu$^t$)-Ala-Gly-ONB (25–27)

2.40 g. (7.5 millimoles) of carbobenzoxy-β-tert. butyl-aspartic acid and 2.70 g. (7.5 millimoles) of the dipeptide-ester-hydrobromide prepared according to step 9 are dissolved in 8 ml. of dimethylformamide. The solution is cooled to 0° C., whereupon it is admixed with 1.54 ml. (7.5 millimoles) of dicyclohexyl-carbodiimide and after the dissolution thereof with 1.04 ml. (7.5 millimoles) of triethylamine. The mixture is stirred at 0° C. for an hour and at room temperature for a further hour. Next day the reaction mixture is evaporated, the residue is dissolved in ethyl acetate and the solution is extracted successively with an N citric acid solution, water, a 0.2 N potassium hydrogen carbonate solution and water. The organic solution is dried over anhydrous sodium sulphate and evaporated. The residue is recrystallized from a mixture of ethyl acetate and petroleum ether. Thus 2.8 g. of the protected dipeptide-ester are obtained (yield: 64%); M.P.: 122–124° C. $R_f^7$ 0.2–0.3.

Step 11: H-Asp(OBu$^t$)-Ala-Gly-OH (25–27)

1.0 g. (1.7 millimoles) of the protected dipeptide-ester prepared according to step 10 are hydrogenated in 15 ml. of methanol in the presence of a palladium-charcoal catalyst. The free tripeptide precipitates until the reaction is completed; this product is re-dissolved by adding water, whereupon the catalyst is removed by filtration, washed on the filter and the filtrate is evaporated. The crystalline residue is recrystallized from a mixture of water and acetone. Thus 0.40 g. of the free tripeptide are obtained (yield: 74%); M.P.: 194° C. (decomposition); $R_f^1$ 0.10–0.15.

Analysis.—$C_{13}H_{23}O_6N_3$ (317.38). Calc. (percent): C, 49.20; H, 7.30; N, 13.24. Found (percent): C, 49.4; H, 7.5; N, 13.3.

Step 12: Z-Asp(OBu$^t$)-Ala-Gly-OH (25–27)

0.9 g. (2.85 millimoles) of the free tripeptide prepared according to step 11 are dissolved in 25 ml. of a 5% sodium hydrogen carbonate solution at 0° C., whereupon the resulting solution is admixed dropwise with 0.64 ml. (3 millimoles) of an about 80% carbobenzoxychloride under cooling and stirring. The reaction mixture is stirred at room temperature, until no more free tripeptide can be detected by chromatographic analysis (about 48 hours are required). The solution is extracted with ether and acidified with citric acid to pH=3. The precipitated oil is extracted with ethyl acetate, the combined ethyl acetate extracts are washed with water, dried and evaporated. The residue is triturated with petroleum ether. Thus 1.15 g. of the amorphous protected tripeptide are obtained (yield: 90%); $R_f^1$ 0.7–0.8.

Step 13: Z-Asp(OBu$^t$)-Ala-Gly-Glu(OBu$^t$)-Asp(OBu$^t$)-Gln - Ser - Ala - Glu(OBu$^t$) - Ala - Phe - Pro - Leu-Glu(OBu$^t$)-Phe-OBu$^t$ (25–39).

3.42 mg. (0.76 millimole) of the protected tripeptide prepared according to step 12 are dissolved in 5 ml. of dimethylformamide and the solution is admixed first with 0.106 ml. (0.76 millimole) of triethylamine and then at −10° C. with 0.76 ml. (about 0.76 millimole) of ethyl chloro formate. The mixture is stirred for 15 minutes whereupon a solution of 937 mg. (0.75 millimole) of the dodecapeptide-hydrochloride prepared according to step 7 and 0.077 ml. (0.55 millimole) of triethylamine in 2.8 ml. of dimethylformamide are added dropwise. The mixture is allowed to stand at room temperature overnight, whereupon it is diluted with water. The precipitated product is separated, washed with water, dried and then washed with ether. The crude product thus obtained is precipitated from a mixture of 45 ml. of methanol and 10 ml. of water, filtered and dried. Thus 805 mg. (yield: 70%) of the protected pentadecapeptide are obtained; $R_f^4$ 0.18–0.23; $R_f^5$ 0.65–0.70.

Step 14: H-Arg(NO$_2$)-Arg(NO$_2$)-Pro-OH.HBr (17–19)

6.5 g. of the protected tripeptide Z-Arg(NO$_2$)-Arg(NO$_2$)-Pro-OH (see K. Sturm, R. Geiger, W. Siedel: Ber. 96, 609 (1963)) are dissolved in 25 ml. of glacial acetic acid, whereupon the solution is admixed with a solution of 25 ml. of 4 N hydrobromic acid in glacial acetic acid and allowed to stand. After the foaming has stopped the tripeptide-hydrobromide is precipitated by adding 200 ml. of ether. The ether is decanted, the precipitate is washed in this way with ether and then with isopropanol, filtered, washed once more with isopropanol on the filter and dried. Thus 5.4 g. of the tripeptide-hydrobromide are obtained (yield: 90%); $R_f^1$ 0.0; $R_f^{H_2O}$ 0.5–0.6.

Step 15: Z-Lys(BOC)-Lys(BOC-N$_2$H$_3$ (15–16)

8.6 g. of the dipeptide-ester Z-Lys(BOC)-Lys(BOC)-OMe (see R. Schwyzer and W. Rittel: Helv. Chim. Acta 44, 159/1961)are dissolved in 15 ml. of hot methanol, whereupon the solution is admixed with 6 ml. of 73% hydrazine-hydrate and refluxed for 4 hours. After completion of the reaction the solution is concentrated, the crystalline residue is triturated with water and dried. Thus 7.8 g. of the crystalline protected dipeptide-hydrazide are obtained. M.P.: 126–128° C.; $R_f^4$ 0.50–0.60 (in the case of the ester 1.0).

Analysis.—$C_{30}H_{50}O_8N_6$ (622.75). Calc. (percent): N, 13.5. Found (percent): N, 13.5.

Step 16: Z-Lys(BOC)-Lys(BOC)-Arg($NO_2$)-Arg($NO_2$)-Pro-OH (15–19)

7.8 g. of the dipeptide-hydrazide Z-Lys(BOC)-Lys(BOC)-$N_2H_3$ prepared according to step 15 are dissolved in 125 ml. of dimethylformamide and the solution is admixed first with 50 ml. of a 0.5 N hydrochloric acid at about —10° C. and then with 12.5 ml. of a molar sodium nitrite solution. The mixture is stirred at about —10° C. for 15 minutes, whereupon it is neutralized with 1.0 ml. of triethylamine and diluted with 250 ml. of cooled chloroform and 250 ml. of water. The chloroform phase is separated, whereupon the aqueous layer is washed with chloroform once more, the united chloroform-solutions are washed with cold water and dried over anhydrous magnesium sulphate. This azide-solution in chloroform is added to the solution obtained by dissolving 7.5 g. of the tripeptide-hydrobromide prepared according to step 14 in 17 ml. of dimethylformamide and adding 4.62 ml. of triethylamine to the solution obtained. The chloroform is distilled off in vacuo and the residual reaction mixture is allowed to stand at room temperature for two days. The dimethylformamide is distilled off and the residue is subjected to chromatography on a column containing 250 g. of silica gel with a mixture of ethyl acetate, pyridine, acetic acid and water (60:10:3:5.5). The fractions containing the pure protected pentapeptide are combined, evaporated and triturated with N hydrochloric acid and water at 0° C. The wash-liquors are removed by decanting. The residual thick oil is dissolved in chloroform, the solution is dried over anhydrous magnesium sulphate, filtered and evaporated. On triturating the residue with ether 5.1 g. of the protected pentapeptide are obtained yield: 42%; $R_f^1$ 0.45–0.55; $[\alpha]_D^{20}=-19°$ (c.=1, in methanol).

Analysis.—$C_{47}H_{77}O_{16}N_{15}$ (1108.21). Calc. (percent): C, 51.6; H, 6.95; N, 18.9. Found (percent): C, 51.5; H, 7.0; N, 19.0.

Step 17: (a) Z-Lys(BOC)Lys(BOC)Arg($NO_2$)-Arg($NO_2$)-Pro-ONP (15–19) (NP=p-nitro-phenyl)

0.65 g. of the protected pentapeptide prepared according to step 16 are dissolved in 3.0 ml. of dimethylformamide and the solution is admixed first with 0.082 ml. of triethylamine and then with 0.059 ml. of ethylchloro at —10° C. The mixture is allowed to stand under cooling for 10 minutes, whereupon it is admixed with 0.24 g. of p-nitrophenol and allowed to stand at room temperature overnight. The dimethylformamide is distilled off and the residue is subjected to chromatography on a column containing 14 g. of silica gel by using a 9:1 mixture of chloroform and methanol. The fractions containing the mainproduct are combined, evaporated and the residue is triturated with ether. Thus 0.47 g. of the protected pentapeptide-p-nitro-phenyl-ester are obtained (yield: 65%); $R_f^4$ 0.3–4.0; $[\alpha]_D^{20}=-20°$ (c.=1, in methanol).

Analysis.—$C_{55}H_{80}O_{18}N_{16}$ (1229.30). Calc. (percent): N, 18.2; Found (percent): N, 18.1.

(b) Z-Lys(BOC)-Lys(BOC)-Arg($NO_2$)-Arg($NO_2$)-Pro-OPCP (15–19) (PCP=pentachlorophenyl-)

1.62 g. of the protected pentapeptide prepared according to step 16, 0.45 g. of pentachlorophenol and 0.4 g. of dicyclohexyl-carbodiimide are dissolved in 4.0 ml. of dimethylformamide. The mixture is allowed to stand overnight, whereupon the precipitated dicyclohexyl-urea is removed by filtration, the dimethylformamide is evaporated from the filtrate, the residue is triturated with ether and dissolved in 1 ml. of a 40:40:1 mixture of chloroform, acetone and water. The solution is subjected to chromatography on a column containing 50 g. of silica gel by using a mixture of chloroform, acetone and water. The fractions containing the pure active ester are combined, evaporated and the residue is triturated with ether. Thus 1.4 g. of the protected pentapeptide-ester are obtained (yield: 70%; $R_f$ amounts to 0.45–0.55 in a system consisting of chloroform, acetone and water (40:40:10). $R_f^4$ 0.55–0.65.

Analysis.—$C_{53}H_{76}O_{16}N_{15}Cl_5$ (1356.54). Calc. (percent): N, 15.4; Cl, 13.05. Found (percent): N, 15.35; Cl, 13.1.

Step 18: Z-Tyr($Bu^t$)-OSu (23)

175 g. of the finely powdered dicyclohexylammonium salt of Z-Tyr($Bu^t$)-OH are suspended in 1 liter of ether, whereupon a solution of 17.5 ml. of concentrated sulfuric acid and 1250 ml. of water is added and the mixture is shaken until complete dissolution takes place. The ether solution is then dried and evaporated, the residual oil is dissolved in 625 ml. of anhydrous dioxane and the solution is admixed with 33.25 g. of N-hydroxy-succinimide and 65.7 g. of dicyclohexyl-carbodiimide under cooling with ice water. The mixture is allowed to stand at room-temperature overnight. The precipitated dicyclohexyl-urea is removed by filtration, the dioxane is distilled off in vacuo and the residual oil is triturated with petroleum ether. On recrystallizing the crude product from 180 ml. of methanol 80 g. of the active ester are obtained (yield: 54%); M.P. 118–120° C.

Step 19: H-Tyr($Bu^t$)-Pro-OH (23–24)

160 g. of the active ester Z-Tyr($Bu^t$)-OSu prepared according to step 18 are dissolved in 2 liters of anhydrous dioxane, the solution is admixed with a solution of 50.3 g. of proline and 36.7 g. of sodium hydrogen carbonate in 1.5 liters of water and the mixture is stirred at room-temperature for 2 hours. The mixture is concentrated to about 1 liter in vacuo, the residue is diluted with 600 ml. of water and extracted with 1 liter of ethyl acetate. The ethyl acetate solution is separated and washed first with a 8% sodium hydrogen carbonae solution and then with water. The combined aqueous solutions are acidified with citric acid to the value of pH=3, the precipitated oil is extracted with ethyl acetate, the ethyl acetate solution is dried and evaporated in vacuo. The residual crude carbobenzyloxy-dipeptide is dissolved in 2.5 l. of ethanol and hydrogenated in the presence of a palladium-charcoal catalyst. The catalyst is filtered off and the filtrate is evaporated in vacuo. Thus 90–95 g. of the amorphous dipeptide are obtained (yield: 79.83%) which is then crystallized from water.

Step 20: H-Val-Tyr($Bu^t$)-Pro-OH (22–24)

21.5 g. of the dipeptide H-Tyr($Bu^t$)-Pro-OH prepared according to step 19 and 9.05 ml. of triethylamine are dissolved in 250 ml. of anhydrous dioxane, whereupon 17.9 g. of the active valine-ester Z-Val-OSu are added. The reaction mixture is allowed to stand overnight until next day, whereafter it is evaporated in vacuo and the residue is dissolved in a mixture of 300 ml. of a 8% aqueous sodium hydrogen carbonate solution and 150 ml. of ether. The aqueous phase is separated, acidified with citric acid to pH=3 and the precipitated oil is extracted with chloroform. The chloroform extract is dried and evaporated. The residual crude carbobenzyloxy-tripeptide is dissolved in 250 ml. of 80% acetic acid and hydrogenated in the presence of a palladium-charcoal catalyst. The catalyst is filtered off, the solvent is distilled off and the residual crude tripeptide is recrystallized from 1.1 litres of anhydrous methanol. Thus a total amount of 13.7 g. of the free tripeptide are obtained (yield: 62%); M.P.: 134–136° C.

Step 21: Z-Lys(BOC)-OSu (21)

67.3 g. of Z-Lys(BOC)-OH are dissolved in 300 ml. of anhydrous dioxane, the solution is cooled with ice-water and admixed with 20.4 g. of N-hydroxy-succinimide and 37.0 g. of dicyclohexyl-carbodiimide. The mixture is allowed to stand under cooling for an hour and then at room temperature for 3 hours. The precipitated dicyclohexyl-urea is removed by filtration and the filtrate is evaporated. The residual crude product is recrystallized from a mixture of 350 ml. of anhydrous benzene and 250 ml. of petroleum ether. Thus 59 g. of the active ester are obtained (yield: 70%); M.P.: 93–96° C.

Step 22: H-Lys(BOC)-Val-Tyr(Bu$^t$)-Pro-OH (21–24)

53.6 g. of the tripeptide H-Val-Tyr(Bu$^t$)-Pro-OH prepared according to step 20 and 17.2 g. of triethylamine are dissolved in 600 ml. of dioxane and the solution is admixed with 59.1 g. of the active lysine-ester Z-Lys(BOC)-OSu. The reaction mixture is allowed to stand at room temperature for 2 days, whereupon it is evaporated in vacuo, the residue is dissolved in 800 ml. of ethyl acetate, the solution is extracted successively with water, a 10% citric acid solution and water. The ethyl acetate solution is dried and evaporated in vacuo. The residue is dissolved in 1 litre of 80% acetic acid and hydrogenated in the presence of a palladium charcoal catalyst. The catalyst is filtered off and the solvent is distilled off. The crude product thus obtained is recrystallized from 4.2 l. of anhydrous methanol. Thus a total amount of 59.5 g. of the tetrapeptide are obtained (yield: 73%); M.P.: 192–193°C.

Step 23: Z-Val-Lys(BOC)-Val-Tyr(Bu$^t$)-Pro-OH (20–24)

41.0 g. of the tetrapeptide H-Lys(BOC)-Val-Tyr(Bu$^t$)-Pro-OH prepared according to step 22 and 8.6 ml. of triethylamine are dissolved in 410 ml. of anhydrous dimethylformamide under shaking and 21.5 g. of the active valine ester Z-Val-OSu are added. The reaction mixture is allowed to stand at room temperature until next day, whereupon it is evaporated in vacuo. The residue is dissolved in 800 ml. of chloroform, the solution is extracted first with a 10% citric acid solution and then with water, whereupon it is dried and the chloroform is distilled off. On triturating the residue with petroleum ether 51.0 g. of the protected pentapeptide are obtained (yield: 93%); M.P.: 123–126° C.

Step 24: H-Val-Lys(BOC)-Val-Tyr(Bu$^t$)-Pro-OH (20–24)

1.4 g. (1.565 millimoles) of the protected pentapeptide prepared according to step 23 are dissolved in 30 ml. of 80% acetic acid and hydrogenated in the presence of a palladium-charcoal catalyst. The reaction having been completed the catalyst is removed by filtration and the filtrate is evaporated. The residue is admixed with 10 ml. of methanol and allowed to stand for crystallization. The crystals formed are filtered off and washed with cold methanol. Thus 0.785 g. of the free pentapeptide are obtained (yield: 66%); M.P.: 202–205° C.

Step 25. Z-Lys(BOC)-Lys(BOC)-Arg(NO$_2$)-Pro-Val-Lys(BOC)-Val-Tyr(Bu$^t$-Pro-OH (15–24)

481 mg. (0.63 millimoles) of the pentapeptide prepared according to step 24, 841 mg. (0.62 millimoles) of the protected active pentapeptide-ester Z-Lys(BOC)-Lys(BOC) - Arg(NO$_2$) - Arg(NO$_2$) - Pro - ONP prepared according to step 17 and 0.088 ml. (0.63 millimoles) of triethylamine are dissolved in 3 ml. of dimethylformamide at 50° C. The reaction mixture is allowed to stand for 8 hours, the product is precipitated with ether, triturated with citric acid and dried. The crude product is subjected to chromatography on a silica gel column by using a mixture of ethyl acetate, pyridine, acetic acid and water (60:10:3:5.5). Thus 848 mg. of the protected decapeptide are obtained (yield: 74%); M.P.: 167–170° C.; R$_f^2$ 0.30–0.36; R$_f^{10}$ 0.10–0.18.

Step 26: Z-Lys(BOC)-Lys(BOC)-Arg(NO$_2$)-Arg(NO$_2$)-Pro-Val-Lys(BOC)-Val-Tyr(Bu$^t$)-Pro-OPCP (15–24)

841 mg. (0.453 millimoles) of the protected decapeptide prepared according to step 25 and 145 mg. (0.545 millimoles) of pentachlorophenol are dissolved in 2.0 ml. of dimethylformamide and 144 mg. (0.695 millimoles) of dicyclohexyl-carbodiimide are added under cooling with ice-water. The reaction mixture is allowed to stand for 2 days, whereupon the precipitated urea is filtered off, washed with dimethylformamide, the combined dimethylformamide solutions are evaporated and the concentrated acetone solution of the residue is subjected to chromatography on a column consisting of silica gel. The column is eluted with acetone, whereby the unreacted acid remains attached on the column. The acetone solution of the ester is evaporated, the residue is triturated with ether, washed and dried. Thus 704 mg. of the protected active decapeptide-ester are obtained (yield: 74%); R$_f^2$ 0.80–0.87; R$_f^{12}$ 0.24–0.33; R$_f^{10}$ 0.79–0.86.

Step 27: Lys(BOC) - Lys(BOC) - Arg - Arg - Pro - Val-Lys(BOC) - Val - Tyr(Bu$^t$) - Pro - Asp(OBu$^t$) - Ala-Gly - Glu(OBu$^t$) - Asp(OBu$^t$) - Gln - Ser - Ala - Glu(OBu$^t$) - Ala - Phe - Pro - Leu - Glu(OBu$^t$) - Phe-OBu$^t$ (15–39)

600 mg. (0.286 millimoles) of the protected pentadecapeptide prepared according to step 13 are hydrogenated in 20 ml. of acetic acid in the presence of a palladium-charcoal catalyst. The reaction having been completed the catalyst is filtered off, the filtrate is evaporated, the residue is triturated with ether, filtered and dried. Thus 490 mg. of the pentadecapeptide having a free N-terminal are obtained (yield: 85%); R$_f^1$ 0.50–0.55; R$_f^{10}$ 0.25–0.30.

The product thus obtained (0.242 millimoles) and 515 mg. (0.242 millimoles) of the protected active decapeptide-ester prepared according to step 26 are dissolved in 3.0 ml. of dimethylformamide and the reaction is carried out at 50° C. during 48 hours. The reaction mixture is triturated with ether, the crude product is precipitated three times from 70% aqueous methanol and finally triturated with acetone. Thus 460 mg. of the protected pentacosapeptide are obtained (yield: 50%); R$_f^2$ 0.42–0.47; R$_f^{10}$ 0.55–0.60.

366 mg. (0.0965 millimoles) of the protected pentacosapeptide are hydrogenated in 100 ml. of 80% acetic acid in the presence of a palladium-charcoal catalyst. The reaction having been completed (this may be seen from the fact that on the chromatogram only the spot R$_f^1$ 0.23–0.27 is visible) the catalyst is filtered off and the filtrate is evaporated. The residue is cooled with ice-water, whereupon it is triturated with 10 ml. of 0.1 N hydrochloric acid admixed with 10 ml. of a 15% sodium chloride solution, filtered, washed with cold water and dried. Thus 225 mg. of the pentacosapeptide-trihydrochloride are obtained (Yield: 63%); R$_f^1$ 0.23–0.27; R$_f^7$ 0.34–0.40.

Step 28: Z-Try-Gly-Lys(BOC)-Pro-Val-Gly-OEt (9–14)

4.95 g. of the tetrapeptide-ester Z-Lys(BOC)-Pro-Val-Gly-OEt (R. Schwyzer and W. Rittel: Helv. Chim. Acta 44, 159 /1961/) are dissolved in ethanol and the carbobenzoxy-protecting group is split off by means of hydrogenation carried out in the presence of a palladium-charcoal catalyst. After completion of the reaction the catalyst is filtered off and the filtrate is evaporated. The residue consists of the tetrapeptide-ester having a free N-terminal (R$_f^1$ 0.40–0.50). The product obtained is dissolved in 7.5 ml. of dimethylformamide and the solution is added to the mixed anhydride prepared as hereinafter described:

2.95 g. of the dipeptide Z-Try-Gly-OH (K. Hofmann, M. E. Woolner, G. Spühler and E. T. Schwartz: J. Am. Chem. Soc. 80, 1486 /1958/) are dissolved in 7.5 ml. of dimethylformamide, whereupon 1.05 ml. of triethylamine and after cooling to —10° C. 0.99 ml. of isobutyl-chloroformate are added. The mixed anhydride thus obtained is stirred for 15 minutes, whereupon the above tetrapeptide-ester solution is added. The combined solutions are allowed to stand overnight, whereupon they are evaporated and the residue is dissolved in ethyl acetate. The ethyl acetate solution is washed at 0° C. successively with diluted hydrochloric acid, water, a 10% sodium-carbonate solution and water. The solution is then dried over anhydrous sodium sulfate and evaporated. The residue is triturated with ether, filtered and dried. The crude protected hexapeptide-ester is dissolved in anhydrous ethyl acetate while warming, the solution is cooled and the precipitated product is filtered off, washed with cold anhydrous ethyl acetate and dried; $[\alpha]_D^{20} = -50°$ (c.=1, in ethanol); $R_f^{12}$ 0.13–0.22; $R_f^4$ 0.48–0.59; after solvolysis with trifluoroacetic acid: $R_f^1$ 0.44–0.50.

Analysis.—$C_{46}H_{64}O_{11}N_8$ (905.04). Calc. (percent): C, 61.05; H, 7.13; N, 12.4. Found (percent): C, 61.05; H, 7.35; N, 12.4.

Step 29: Z-Arg-Try-Gly-Lys(BOC)-Pro-Val-Gly-OEt.HCl (8–14)

3.5 g. of the protected hexapeptide-ester prepared according to step 28 are hydrogenated in ethanol in the presence of a palladium-charcoal catalyst in order to split the carbobenzoxy protecting group off. The reaction having been completed the catalyst is filtered off and the filtrate is evaporated. The residual oil ($R_f^1$ 0.54–0.64) and 1.33 g. of carbobenzoxy-L-arginine-hydrochloride are dissolved in a mixture of 3.9 ml. of pyridine and 3.9 ml. of dimethylformamide, whereupon the solution is admixed with 1.2 g. of dicyclohexyl-carbodiimide and allowed to stand at room-temperature for 2 days. After completion of the reaction the dicyclohexyl-urea is filtered off, the filtrate is evaporated and the residue is dissolved in chloroform. The resulting solution is washed at 0° C. successively with diluted hydrochloric acid and water, dried over anhydrous magnesium sulphate and evaporated. The residue is dissolved again in chloroform, ether is added, the precipitated product is filtered off, washed with ether and dried. Thus 3.6 g. of the protected heptapeptide-ester-hydrochloride are obtained; $R_f^1$ 0.43–0.53; $R_f^{10}$ 0.1–0.25 $[\alpha]_D^{20} = -41°$ (c.=1, in ethanol).

Analysis.—$C_{52}H_{77}O_{12}N_{12}Cl$ (1097.69). Calc. (percent): C, 56.9; H, 7.1; N, 15.3; Cl, 3.25. Found (percent): C, 56.55; H, 7.1; N, 15.3; Cl, 2.9.

Step 30: Z-Arg-Try-Gly-Lys(BOC)-Pro-Val-Gly-OH.HCl (8–14)

9.9 g. of the protected heptapeptide-ester-hydrochloride prepared according to step 29 are dissolved in methanol. The solution is admixed with 18 ml. of an N sodium hydroxide solution, whereupon it is allowed to stand for an hour and neutralized with 1.08 ml. of acetic acid. The solution is admixed with 18 ml. of an N sodium hydrochromatography on a column (3 x 70 cm.) containing 200 g. of silica gel by using a mixture of ethyl acetate, pyridine, acetic acid and water (60:20:6:11). The fractions containing the pure main-product are combined, evaporated, the residue is dissolved in a 1:1 mixture of chloroform and butanol and the solution is washed at 0° C. first with 0.5 N hydrochloric acid and then with water. The solution is dried, whereupon the solvent is distilled off and the residue is triturated with ether. Thus 6.15 g. of the protected heptapeptide-hydrochloride are obtained (yield: 64%); $R_f^1$ 0.14–0.20. $[\alpha]_D^{20} = -29°$ (c.=1, in ethanol).

Analysis.—$C_{50}H_{73}O_{12}N_{12}Cl$ (1069.64). Calc. (percent): C, 56.14; H, 6.88; N, 15.72. Found (percent): C, 56.7 H, 7.0; N, 15.7.

Step 31: H-Arg-Try-Gly-Lys(BOC)-Pro-Val-Gly-OH.HCl (8–14)

6.0 g. of the protected heptapeptide-hydrochloride prepared according to step 30 are dissolved in ethanol and hydrogenated in the presence of a palladium-charcoal catalyst. The reaction having been completed the catalyst is filtered off, the solution is evaporated and the resdiue is triturated with ether. Thus 4.25 g. of the heptapeptide-hydrochloride are obtained (yield: 81.5%); $R_f^1$ 0.04–0.14; $R_f^7$ 0.50–0.58. After solvolysis with trifluoroacetic acid: $R_f^1$ 0.0; $R_f^7$ 0.33–0.40; $[\alpha]_D^{20} = -30°$ (c.=1, in ethanol).

Analysis.—$C_{42}H_{67}O_{10}N_{12}$ Cl (935.51). Calc. (percent): N, 17.97; Cl, 3.8. Found (percent): N, 18.0; Cl, 3.7.

Step 32: Z-Glu(OBu$^t$)-His-Phe-OMe (5–7)

11.8 g. of the protected dipeptide Z-His-Phe-OMe (St. Guttmann and R. A. Boissonnas: Helv. Chim. Acta 41, 1852 (1958)) are dissolved in a methanolic solution or 1.04 g. of hydrochloric acid and the carbobenzoxy protective group is split off by means of hydrogenation carried out in the presence of a palladium-charcoal catalyst. After completion of the reaction the catalyst is filtered off, the filtrate is evaporated and the crystalline residue is recrystallized from a mixture of methanol and ether. Thus 6.4 g. of the dipeptide-ester-hydrochloride are obtained (yield: 70%).

The product thus obtained and 8.67 g. of carbobenzoxy glutamic acid-α-tert.butyl-α-p-(nitro-phenyl)-ester are dissolved in 90 ml. of dimethylformamide. The solution is admixed with 2.6 ml. of triethylamine and allowed to stand at room temperature for 2 days. The reaction-mixture is evaporated, whereupon the residue is dissolved in a mixture of ethyl acetate and water, the aqueous phase is separated and the organic layer is washed successively with a 5% aqueous triethylamine solution and water, dried and evaporated. The residue is crystallized from a mixture of methanol and water. Thus 7.5 g. of the protected tripeptide-ester are obtained (M.P.: 180–182° C.).

Step 33: Z-Glu/OBu$^t$-His-Phe-N$_2$H$_3$ (5–7)

12.7 g. of the protected tripeptide-ester prepared according to step 32 are dissolved in methanol. The solution is admixed at room temperature with 3.2 ml. of a 94% hydrazine-hydrate solution and allowed to stand for 3 days at room temperature. The solvent is then distilled off and the residue dried in vacuo over concentrated sulfuric acid. The foam-like product thus obtained is crystallized from a 1:1 mixture of ethanol and water. Thus 11.0 g. of the protected tripeptide-hydrazide are obtained (yield: 86.5%); M.P.: 209–210° C.

Step 34: Z-Glu(OBu$^t$)-His-Phe-Arg-Try-Gly-Lys(BOC)-Pro-Val-Gly-OH (5–14)

3.2 g. of the protected tripeptide-hydrazide prepared according to step 33 are dissolved in 9.0 ml. of dimethyl-formamide and the solution is admixed at −30° C. first with a solution of 720 mg. of hydrogen chloride in 10 ml. of tetrahydrofurane, then with 0.84 ml. of isoamyl nitrite and after 5 minutes of stirring with 4.0 ml. of triethylamine. The solution of 5.4 g. of the heptapeptide prepared according to step 31 and 12.0 ml. of dimethylformamide is added to the azide-solution thus obtained. The reaction mixture is stirred at a temperature between −10° C. and −20° C. for an hour, whereupon it is allowed to stand at 0° C. over night. After evaporating the reaction mixture the residue is triturated with water, dried and the dry crude product is subjected to chromatography on a column consisting of 140 g. of silica gel by using a mixture of ethyl acetate, pyridine, acetic acid and water (60:20:6:11). The fractions containing the main product in pure form are combined evaporated and the residue is triturated with ether. Thus 4.0 g. of the protected decapeptide are obtained. $R_f^1$ 0.15–0.20.

Step 35: H-Glu(OBu$^t$)-His-Phe-Arg-Try-Gly-Lys(BOC)-Pro-Val-Gly-OH (5–14)

3.5 g. of the protected decapeptide prepared according to step 34 are hydrogenated in a mixture of 80 ml. of methanol, 10 ml. of water and 1 ml. of glacial acetic acid in the presence of a palladium-charcoal catalyst. The reaction having been completed the catalyst is filtered off, the filtrate is evaporated, and the residue is dissolved in 10 ml. of methanol. The product is precipitated by adding 100 ml. of ether, filtered off and dried. Thus 3.0 g. of the free decapeptide are obtained (yield: 100%); $R_f^1$ 0.05–0.10.

Step 36: BOC-Ser-Tyr-Ser-Met-Glu(OBu$^t$)-His-Phe-Arg-Try-Gly-Lys(BOC)-Pro-Val-Gly-OH.HCl (1–14)

3.1 g. of the tetrapeptide-hydrazide BOC-Ser-Tyr-Ser-Met-N$_2$H$_3$ (B. Iselin and R. Schwyzer: Helv. Chim. Acta 44, 169/1961) are dissolved in 15 ml. of dimethylformamide, the solution is cooled to −30° C., whereupon first 2.35 ml. 6 N hydrochloric acid and then a concentrated aqueous solution of 410 mg. of sodium nitrite are added. The azide solution thus obtained is immediately added to a solution of the decapeptide prepared according to step 35, 2.1 ml. of triethylamine and 15 ml. of dimethylformamide cooled to −20° C. The reaction mixture is stirred at a temperature between −10° C. and −20° C. for an hour, whereafter it is allowed to stand at 0° C. over night. The reaction mixture is evaporated, whereupon the residue is triturated with water to yield a powder and the product is subjected to chromatography on a column containing 150 g. of silica gel by using a mixture of ethyl acetate, pyridine, acetic acid and water (60:20:6:11). The fractions containing the pure main product are combined and evaporated. The residue is dissolved in 20–30 ml. of methanol while adding 1–2 g. of pyridine hydrochloride, whereupon the solution is concentrated, the product is precipitated by adding water, triturated to yield a powder, filtered off, washed with water and dried. Thus 2.3 g. of the protected tetradecapeptide-hydrochloride are obtained; $R_f^1$ 0.10–0.15.

Amino acid analysis (the calculated values are disclosed in parentheses): Ser 1.95 (2), Tyr 0.95 (1) Met 1.0 (1), Glu 1.0 (1), His 1.05 (1), Phe 1.0 (1), Arg 0.95 (1), Gly 2.0 (2), Lys 1.05 (1), Pro 0.95 (1), Val 1.05 (1).

Step 37: BOC-Ser-Tyr-Ser-Met-Glu(OBu$^t$)-His-Phe-Arg-Try - Gly - Lys(BOC) - Pro - Val - Gly-Lys(BOC)-Lys (BOC) - Arg - Arg-Pro-Val-Lys(BOC)-Val-Tyr(Bu$^t$)-Pro - Asp(OBu$^t$) - Ala - Gly - Glu(OBu$^t$)-Asp(OBu$^t$)-Gln - Ser - Ala - Glu(OBu$^t$) - Ala - Phe - Pro - Leu-Glu (OBu$^t$)-Phe-OBu$^t$.3HCOOH (1–39)

202 mg. (0.055 millimoles) of the pentacosapeptide-trihydrochloride prepared according to step 27, 118 mg. (0.060 millimoles) of the protected tetradecapeptide prepared according to step 36, 38 mg. (0.144 millimoles) of pentachlorophenol and 30 mg. (0.145 millimoles) of dicyclohexyl carbodiimide are dissolved in 0.6 ml. of dimethylformamide containing 0.077 ml. (0.055 millimoles) of triethylamine. The reaction-mixture is allowed to stand at room-temperature for 4 days, whereupon it is diluted with ether free of peroxide. The precipitated product is filtered off, washed with ether and dried. The crude product thus obtained is subjected to chromatography on a column of silica gel by using a mixture of ethyl acetate, pyridine formic acid and water. The fractions containing the main-product in pure form are combined, evaporated and the residue is triturated with ether free of peroxide. The fractions containing the main-product together with other substances are also combined and a further amount of the main-product is obtained thereof in a chromatographic way. Thus a total amount of 136 mg. of the protected nonatriacontapeptide are obtained (yield: 44%); $R_f^7$ 0.31–0.37.

Step 38: H - Ser - Tyr-Ser-Met-Glu-His-Phe-Arg-Try-Gly-Lys - Pro - Val - Gly - Lys - Lys-Arg-Arg-Pro-Val-Lys-Val - Tyr - Pro - Asp - Ala - Gly-Glu-Asp-Gln-Ser-Ala-Glu-Ala-Phe-Pro-Leu-Glu-Phe-OH-($\alpha_h$-ACTH)

100 mg. of the protected nonatriacontapeptide prepared according to step 37 are dissolved in 2 ml. of trifluoroacetic acid, the solution is allowed to stand for 15 minutes, whereupon it is evaporated in vacuo. The residue is dissolved in 2 ml. of water and evaporated again. The dissolution and the evaporation is repeated, whereafter the residue is dissolved in 5 ml. of water, the solution is passed through a column filled with an Amberlite IRA–400 ion exchange-resin of the acetate-cycle and the column is washed with 20 ml. of water. The combined aqueous solutions are lyophilized. The lyophilized product consists of 80 mg. of the free nonatriacontapeptide identical with human corticotropine (yield: about 80%). $R_f^6$ 0.23–0.30.

Amino acid analysis: Asp 1.8 (2), Ser 2.7 (3), Glu 4.5 (5), Pro 3.8 (4), Gly 2.9 (3), Ala 3.0 (3), Leu 1.0 (1), Val 2.9 (3), Met 0.95 (1), Tyr 1.9 (2), Phe 3.0 (3), His 0.9 (1), Lys 3.8 (4), Arg 2.8 (3), Tyr:Tyr 2.2 (2).

EXAMPLE 2

Modification of the Synthesis of Human Corticotropine

Step 1: Z-Val-Lys(BOC)-Val-Tyr(Bu$^t$)-Pro-OSu (20–24)

51.5 g. of the pentapeptide Z-Val-Lys(BOC)-Val-Tyr(Bu$^t$)-Pro-OH prepared according to step 23 of Example 1 and 13.2 g. of N-hydroxy-succinimide are dissolved in 400 ml. of anhydrous dioxane, whereupon the solution is cooled with ice-water and admixed with 12.1 g. of dicyclohexyl-carbodiimide. The mixture is allowed to stand under cooling for half an hour and then at room-temperature until next day. The reaction-mixture is evaporated in vacuo, whereupon the residue is dissolved in 1 litre of ethyl acetate and the solution is washed three times with a 2% sodium hydrogen carbonate solution each. After drying the ethyl acetate is distilled off in vacuo and the residue is triturated with anhydrous ether, filtered off and dried in vacuo over phosphorous pentoxide. Thus 49.0 g. of the active pentapeptide-ester are obtained. Yield: 86%; M.P. 171–173° C.

Step 2: Z-Val-Lys(BOC)-Val-Tyr(Bu$^t$)-Pro-Asp(OBu$^t$)-Ala-Gly-OH (20–27)

130 mg. of the finely powdered tripeptide H-Asp (OBu$^t$)-Ala-Gly-OH prepared according to Example 1 step 11 are suspended in 3.6 ml. of anhydrous dimethylformamide containing 36 mg. of triethylamine. 365 mg. of the active pentapeptide-ester Z-Val-Lys(BOC)-Val-Tyr (Bu$^t$)-Pro-OSu prepared according to Example 2 step 1 are added to the suspension under stirring and the reaction-mixture is stirred at room-temperature for 12 hours, whereby the tripeptide is slowly dissolved. The mixture is allowed to stand for 36 hours, whereupon it is evaporated to dryness in vacuo. The residue is dissolved in 3 ml. of a 120:20:6:11 mixture of ethyl acetate, pyridine, acetic acid and water. The solution is passed through a 20 x 250 mm. column filled with silica gel and eluted with the above solvent mixture. The fractions containing the pure product are combined, evaporated in vacuo and the residue is triturated with water to yield a powder. After drying in a desiccator over phosphorous pentoxide 304 mg. of the protected octapeptide are obtained (yield: 70%); $R_f^2$ 0.50–0.55; $R_f^{11}$ 0.55–0.60.

Step 3: Z-Val-Lys(BOC)-Val-Tyr(Bu$^t$)-Pro-Asp(OBu$^t$)-Ala - Gly - Glu(OBu$^t$) - Asp(OBu$^t$) - Gln-Ser-Ala-Glu (OBu$^t$) - Ala - Phe - Pro - Leu - Glu(OBu$^t$) - Phe-OBu$^t$ (20–39)

120 mg. (0.1 millimole) of the protected octapeptide prepared according to Example 2 step 2 are dissolved in 2 ml. of anhydrous dioxane, whereupon the solution is admixed with 23 mg. (0.2 millimoles) of N-hydroxy-succinimide and then with 25 mg. (0.12 millimoles) of dicyclohexyl-carbodiimide. The mixture is allowed to stand at room-temperature for 24 hours, whereafter the precipitated dicyclohexyl-urea is filtered off and the filtrate is evaporated to dryness. According to thin layer chromatography the product contains not more than 5% of unreacted octapeptide starting material; the $R_f^{11}$ value of the active octapeptide-ester obtained amounts to 0.85–

0.95. The active octapeptide-ester thus obtained is dissolved in 1 ml. of dimethylformamide without further purification. 170 mg. (0.1 millimoles) of the dodecapeptide-hydrochloride prepared according to Example 1 step 7 are dissolved in this solution, whereafter a solution of 30 mg. (0.3 millimoles) of triethylamine in 0.5 ml. of dimethylformamide is added. The mixture is allowed to stand at room temperature for 2 days, whereupon the solvent is distilled off in vacuo, the residue is triturated with water; filtered off and dried in a desiccator. Thus 222 mg. of the highly insoluble icosapeptide are obtained. The active ester used as starting material, the corresponding free acid and ninhydrine-positive impurities could not be detected in this product. Thin layer chromatography in 90% acetic acid: $R_f$ 0.75–0.85.

Step 4: H-Val-Lys(BOC)-Val-Tyr($Bu^t$)-Pro-Asp($OBu^t$)-Ala - Gly - Glu($OBu^t$) - Asp($OBu^t$)-Gln-Ser-Ala-Glu($OBu^t$) - Ala - Phe - Pro - Leu - Glu($OBu^t$) - Phe-$OBu^t$ (20–39)

100 mg. of the protected eicosapeptide prepared according to step 3 are dissolved in 10 ml. of 80% acetic acid and hydrogenated in the presence of 70 mg. of a 10% palladium-charcoal-catalyst. The catalyst is filtered off, whereupon the filtrate is evaporated in vacuo and the residue dried in a desiccator over sodium hydroxide. Thus 90 mg. of the free eicosapeptide-ester are obtained in the form of glassy amorphous scales. The product is uniform according to chromatographic analysis and shows a faint positive ninhydrine-reaction; it does not contain any protected eicosapeptide; $R_f^1$ 0.76–0.84; $R_f^{11}$ 0.47–0.53.

Step 5: Z-Lys(BOC)-Lys(BOC)-Arg($NO_2$)-Arg($NO_2$)-Pro - Val - Lys(BOC) - Val - Tyr($Bu^t$) - Pro - Asp ($OBu^t$) - Ala - Gly - Glu($OBu^t$) - Asp($OBu^t$) - Gly-Ser - Ala - Glu($OBu^t$) - Ala - Phe - Pro - Leu - Glu($OBu^t$)-Phe-$OBu^t$ (15–39)

90 mg. of the eicosapeptide prepared according to step 4 are dissolved in 1.0 ml. of dimethylformamide containing 6 mg. of triethylamine. The solution is admixed with 45 mg. of the protected pentapeptide-pentachlorophenyl-ester prepared according to Example 1 step 17(b) and allowed to stand at room-temperature for 3 days. The solvent is distilled off in vacuo. The unreacted eicosapeptide and the small amount of active pentapeptide-ester is removed from beside the residual product by means of chromatography on a silica gel column by using a solvent mixture consisting of ethyl acetate, pyridine, acetic acid and water (120:20:6:11) or that of chloroform and methanol (80:20).

Thus 54 mg. of the protected pentacosapeptide are obtained (yield: 40%); $R_f^2$ 0.42–0.47; $R_f^{10}$ 0.55–0.60. The protective group of this product may be removed as described in Example 1 step 27 and it may be coupled with the protected tetradecapeptide (1–14) according to the method disclosed in Example 1 step 37.

EXAMPLE 3

Synthesis of the Corticotropine-Fragment
H-Ser-Tyr-Ser-Met-Glu-His-Phe-Arg-Try-Gly-Lys-Pro-Val-Gly-OH (1–14)

200 mg. of the protected tetradecapeptide prepared according to Example 1 step 36 are dissolved in 5.0 ml. of trifluoroacetic acid containing 0.02% of mercapto-ethanol. After 20 minutes the solution is evaporated in vacuo, the residue is dissolved in 5 ml. of water. The solution is passed through a column consisting of 5 ml. of an Amberlite IRA–410 ion-exchanger resin (in the acetate cycle) and the column is eluted five times with 3 ml. of water each. The united aqueous solutions are subjected to lyophilization. Thus 180 mg. of the free tetradecapeptide are obtained. $R_f^6$ 0.45–0.50.

Amino acid analysis: Ser 1.95 (2), Tyr 0.95 (1), Met 1.0 (1), Glu 1.0 (1), His 1.05 (1), Phe 1.0 (1), Arg 0.95 (1), Gly 2.0 (2), Lys 1.05 (1), Pro 0.95 (1), Val 1.05 (1).

EXAMPLE 4

Synthesis of the Cortocotropine-Fragment 1–14-Amide

Step 1: BOC-Ser-Tyr-Ser-Met-Glu($OBu^t$)-His-Phe-Arg-Try-Gly-Lys(BOC)-Pro-Val-Gly-$NH_2$,HCl (1–14)

197 mg. of the protected tetradecapeptide-hydrochloride prepared according to Example 1 step 36 are dissolved in 0.5 ml. of dimethylformamide containing 5 mg. of ammonia, whereupon the solution is admixed with 60 mg. of dicyclohexyl-carbodiimide and allowed to stand at room-temperature overnight. The addition of ammonia is repeated next day in the same way and the reaction mixture is admixed with a further 60 mg. amount of dicyclohexyl-carbodiimide. After 2 days the solution is diluted with ether free of peroxide, the precipitated product is filtered and subjected to chromatography on a column of silica gel by using a solvent-system of ethyl acetate, pyridine, acetic acid and water (60:20:6:11). Thus 150 mg. of the protected tetradecapeptide-amide are obtained (yield: 75%); $R_f^1$ 0.20–0.25.

Step 2: H-Ser-Tyr-Ser-Met-Glu-His-Phe-Arg-Try-Gly-Lys-Pro-Val-Gly-$NH_2$ (1–14)

The protective groups are removed from 100 mg. of the tetradecapeptide-amide prepared according to step 1 by means of the method described in Example 3. Thus 60 mg. (yield 70%) of the free tetradecapeptide-amide are obtained; $R_f^6$ 0.55–0.60.

EXAMPLE 5

Synthesis of the Corticotropine Fragment (1–15 Amide)

Step 1: Z-Lys(BOC)-$NH_2$ 2.5 g. of the active protected lysine-ester Z-Lys(BOC)-ONP are dissolved in 25 ml. of methanol, whereupon 1.5 ml. of a concentrated ammonium hydroxide solution are added and the solution is allowed to stand overnight. The solution is then evaporated, the crystals obtained are washed with a diluted ammonia-solution and recrystallized from a mixture of 20 ml. of ethanol and 30 ml. of water. Thus 1.35 g. of the protected lysine-amide are obtained (yield: 71%); M.P.: 140–141° C.; $R_f^4$ 0.6.

Step 2: H-Lys(BOC)-$NH_2$ 800 mg. of the protected lysine-amide prepared according to step 1 are hydrogenated in 40 ml. of methanol in the presence of a palladium-charcoal catalyst, whereupon the catalyst is filtered off, the filtrate is evaporated and the residue is crystallized. Thus 440 mg. of the free lysine-amide H-Lys(BOC)-$NH_2$ are obtained (yield: 86%); $R_f^1$ 0.34.

Analysis.—$C_{11}H_{23}N_3O_3$ (245, 33). Calc. (percent): Amide-N, 5.7. Found (percent): Amide-N 5.5.

Step 3: BOC-Ser-Tyr-Ser-Met-Glu($OBu^t$)-His-Phe-Arg-Try-Gly-Lys(BOC)-Pro-Val-Gly-Lys(BOC)-$NH_2$ (1–15)

40 mg. of the lysine-amide prepared according to step 2 and 197 mg. of the protected tetradecapeptide-hydrochloride obtained as described in Example 1 step 36 are dissolved in 0.5 ml. of dimethylformamide. The solution is admixed with 53 mg. of pentachlorophenol and 45 mg. of dicyclohexyl-carbodiimide and allowed to stand at room temperature for 2 days. The reaction mixture is diluted with anhydrous ether, the precipitated product is filtered off, washed with ether and subjected to chromatography on a column of silica gel. The fractions containing the pure main product are combined, evaporated and the residue is triturated with ether. Thus 120 mg. of the protected pentadecapeptide-amide are obtained (yield: 60%); $R_f^1$ 0.2–0.25.

Step 4: H-Ser-Tyr-Ser-Met-Glu-His-Phe-Arg-Try-Gly-Lys-Pro-Val-Gly-Lys-NH₂

100 mg. of the protected pentadecapeptide-amide prepared according to step 3 are subjected to the treatment described in Example 3 in order to remove the protective groups. The free pentadecapeptide-amide is obtained by almost quantitative yields; $R_f^6$ 0.45–0.55.

EXAMPLE 6

Synthesis of the Corticotropine-Fragment (1–16-Amide)

Step 1: Z-Lys(BOC)-Lys(BOC)-NH₂ (15–16)

2.0 g. of the protected dipeptide-ester Z-Lys(BOC)-Lys(BOC)-OMe (see R. Schwyzer and W. Rittel: Helv. Chim. Acta 44, 159 /1961/) are dissolved in 50 ml. of methanol and the solution is saturated with ammonia gas. The mixture is allowed to stand at room temperature for 2 days, whereupon it is evaporated. The crystalline residue is recrystallized from a small amount of methanol. Thus 1.6 g. of the protected dipeptide-amide are obtained (yield: 83%); M.P.: 160–162° C.; $R_f$ 0.0 (chloroform-methanol 98:2, where th ester migrates with the $R_f$ value of 0.2–0.25).

Step 2: H-Lys(BOC)-Lys(BOC)-NH₂ (15–16)

1.0 g. of the protected dipeptide amide prepared according to step 1 is hydrogenated in the presence of a palladium-charcoal catalyst in methanol as medium. After completion of the reaction the catalyst is filtered off and the solution is evaporated. Thus 0.75 g. of the free dipeptide-amide are obtained in the form of a crystalline residue (yield: 100%); $R_f^1$ 0.7 the corresponding value of the protected dipeptideamide amounts to 1.0); $R_f^7$ 0.7.

Step 3: BOC-Ser-Tyr-Ser-Met-Glu(OBuᵗ)-His-Phe-Arg-Try-Gly-Lys(BOC)-Pro - Val - Gly - Lys(BOC)-Lys(BOC)-NH₂ (1–16)

197 mg. of the protected tetradecapeptide-hydrochloride prepared according to Example 1 step 36, 60 mg. of the free dipeptide-amide obtained as shown in the above step 2, 50 mg. of pentachlorophenol and 45 mg. of dicyclohexyl-carbodiimide are dissolved in 0.5 ml. of dimethylformamide. The solution is allowed to stand at room-temperature for 2 days, whereupon it is diluted with ether free of peroxide. The precipitated product is filtered off and subjected to chromatography on a silica gel column by using a solvent-mixture consisting of ethyl acetate, pyridine, acetic acid and water (60:20:6:11). Thus 125 g. of the protected hexadecapeptide-amide are obtained (yield: 50%); $R_f^1$ 0.20–0.25.

Step 4: H-Ser-Tyr-Ser-Met-Glu-His-Phe-Arg-Try-Gly-Lys-Pro-Val-Gly-Lys-Lys-NH₂ (1–16)

100 mg. of the protected hexadecapeptide-amide prepared according to step 3 are subjected to the treatment described in Example 3 in order to remove the protective group. Thus 70 mg. of the free hexadecapeptide-amide are obtained (yield: about 80%); $R_f^6$ 0.35–0.40.

EXAMPLE 7

Synthesis of the Corticotropine-Fragment (1–17-Amide)

Step 1: Z-Lys(BOC)-Lys(BOC)-Arg(NO₂)-NH₂ (15–17)

(a) Preparation of the azide: 3.12 g. of the protected dipeptide-hydrazide Z-Lys(BOC)-Lys(BOC)-N₂H₃ prepared according to Example 1 step 15 are dissolved in 50 ml. of dimethylformamide and the solution is admixed at about —10° C. with 20 ml. of 0.5 N hydrochloric acid and then with 5.0 ml. of a molar sodium nitrite solution. The mixture is stirred at a temperature of about —10° C. for 15 minutes, whereupon it is neutralized with 1.0 ml. of triethylamine and diluted with 50 ml. of cooled chloroform and 50 ml. of water. The chloroform layer is separated, whereupon the aqueous phase is washed with chloroform once more, the chloroform solutions are combined, washed with cold water, dried over magnesium sulphate and reacted with the amino-component as hereinafter described.

(b) Coupling: 1.5 g. of ω-nitro-arginine-amide-hydrobromide (H. Otsuka, K. Inouye, M. Kanayama and F. Shinotaki: Bull. Chem. Soc. Japan 38, 1563 (1965)) are dissolved in 10 ml. of dimethylformamide. The solution is admixed with 0.77 ml. of triethylamine and the azide-solution prepared as shown in paragraph (a) is filtered to the mixture thus obtained. The chloroform is distilled, and the residual reaction-mixture is allowed to stand at room-temperature overnight. The dimethylformamide is distilled off in vacuo, whereupon the residue is dissolved in 200 ml. of ethyl acetate, the solution is washed at 0° C. sucessively with N hydrochloric acid and water, dried and evaporated. The residual crystalline protected tripeptide-amide is slurried in ethyl acetate, the mixture is filtered and the product is dried. Thus 3.1 g. of the protected tripeptide-amide are obtained (yield: 77%); M.P.: 92–94° C.; $R_f^2$ 0.80–0.88.

Step 2: H-Lys(BOC)-Lys(BOC)-Arg-NH₂.2HCl (15–17)

1.5 g. of the protected tripeptide-amide prepared according to step 1 are hydrogenated in 75 ml. of acetic acid in the presence of a palladium-charcoal catalyst. The reaction having been completed the catalyst is filtered off and the filtrate is evaporated. The residue is dissolved in chloroform, the solution is admixed with 1.0 g. of pyridine-hydrochloride. The product is precipitated by adding ether, then triturated with ether, dissolved in 1 ml. of a mixture of chloroform and methanol (60:38) and the solution is passed through a silica gel column. The product is eluted by using a mixture consisting of chloroform, methanol and water (60:38:10). The fractions containing the main-product are combined, evaporated and the residue is triturated with ether. Thus 1.0 g. of the tripeptide-amide-dihydrochloride is obtained (yield: 77%); $R_f^3$ 0.70–0.80. (The ammonium-acetate formed by hydrogenolysis was converted into ammonium chloride, which migrates with a smaller $R_f$-value and remains behind by chromatography.)

Step 3: BOC - Ser - Tyr-Ser-Met-Glu(OBuᵗ)-His-Phe-Arg - Try - Gly-Lys(BOC)-Pro-Val-Gly-Lys(BOC)-Lys(BOC)-Arg-NH₂ (1–17)

197 mg. of the protected tetradecapeptide-hydrochloride prepared according to Example 1 step 36, 100 mg. of the tripeptide-amide-dihydrochloride obtained as shown in the above step 2, 53 mg. of pentachlorophenol and 46 mg. of dicyclohexylcarbodiimide are dissolved in 0.5 ml. of dimethylformamide containing 14 mg. of triethylamine. The reaction-mixture is allowed to stand at room-temperature for 2 days, whereupon it is diluted with ether and the precipitated crude reaction-product is subjected to chromatography on a silica gel column by using a solvent-mixture of ethyl acetate, pyridine, formic acid and water (40:20:6:5.5). The fractions containing the main-product are combined, evaporated and the residue is triturated with ethyl acetate. Thus 149 mg. of the protected heptadecapeptide-amide are obtained (yield: 58%); $R_f^5$ 0.38–0.43; $R_f^7$ 0.08–0.13.

Step 4: H-Ser-Tyr-Ser-Met-Glu-His-Phe-Arg-Try-Gly-Lys-Pro-Val-Gly-Lys-Lys-Arg-NH₂ (1–17)

The protective groups of 100 mg. of the protected heptadecapeptide-amide prepared according to step 3 are removed by means of the method described in Example 3. Thus 70 mg. of the free heptadecapeptide-amide are obtained (yield: about 75%); $R_f^6$ 0.30–0.35.

EXAMPLE 8

Synthesis of the Corticotropine-Fragment (1–18-Amide)

Step 1: Z-Lys(BOC)-Lys(BOC)-Arg($NO_2$)-Arg($NO_2$)-$NH_2$ (15–18)

1.85 g. of the protected dipeptide-hydrazide Z-Lys(BOC)-Lys(BOC)-$N_2H_3$ are converted into an azide solution in chloroform according to the method described in Example 7 step 1(a) and the solution thus obtained is added to a solution prepared as hereinafter described:

1.8 g. of the dipeptide-derivative H-Arg($NO_2$)-Arg($NO_2$)-$NH_2$·HBr (see H. Otsuka, K. Inouye, M. Kanayama and E. Shizonaki: Bull. Chem. Soc. Japan 38, 1563/1965/) and 0.6 ml. of triethylamine are dissolved in 8.0 ml. of dimethylformamide, whereupon the azide-solution prepared according to the above paragraph is added and the reaction-mixture is allowed to stand at room-temperature for 2 days. The solvent is evaporated, whereupon the residue is passed through a silica gel column and the column is eluted with a mixture of ethyl acetate, pyridine, acetic acid and water (60:10:3:5.5). The fractions containing the pure main-product are combined, evaporated and the residue is triturated with ether. Thus 2.05 g. of the protected tetrapeptide-amide are obtained (yield: 68%); $R_f^2$ 0.38–0.48.

Step 2: H-Lys(BOC)-Lys(BOC)-Arg-Arg-$NH_2$·3HCl (15–18)

0.4 g. of the protected tetrapeptide-amide prepared according to step 1 are subjected to hydrogenolysis in 10.0 ml. of acetic acid in the presence of a palladium-charcoal catalyst. The reaction having been completed the catalyst is filtered off and the solution is evaporated. The residue is dissolved in chloroform, admixed with 0.3 g. of pyridine hydrochloride and the product is precipitated on addition of ether. The precipitate is dissolved in 0.5 ml. of a mixture of chloroform and methanol (60:38), the solution is passed through a silica gel column and the column is eluted with a mixture of chloroform, methanol and water (60:38:10). The fractions containing the pure main-product are combined, evaporated and the residue is triturated with ether. Thus 0.3 g. of the tetrapeptide-amide-trihydrochloride are obtained (yield: 86%); $R_f^3$ 0.55–0.65.

Step 3: BOC-Ser-Tyr-Ser-Met-Glu(OBu$^t$)-His-Phe-Arg-Try-Gly-Lys(BOC)-Pro-Val - Gly - Lys(BOC) - Lys(BOC)-Arg-Arg-$NH_2$ (1–18)

103.5 mg. of the protected tetradecapeptide-hydrochloride prepared according to Example 1 step 36, 65 mg. of the free tetrapeptide-amide-trihydrochloride obtained as shown in the preceding step 2, 26 mg. of pentachlorophenol and 21 mg. of dicyclohexyl-carbodiimide are dissolved in 0.3 ml. of dimethylformamide containing 7.6 mg. of triethylamine. The reaction mixture is allowed to stand at room temperature for 2 days and diluted with ether free of peroxide. The precipitated crude reaction-product is passed through a silica gel column which is then eluted with a mixture of ethyl acetate, pyridine, formic acid and water (40:20:6:5.5). The fractions containing the pure main product are combined, evaporated and the residue is triturated with ethyl acetate. Thus 73 mg. of the protected octadecapeptide-amide are obtained (yield: 51%); $R_f^5$ 0.17–0.23.

Step 4: H-Ser-Tyr-Ser-Met-Glu-His-Phe-Arg-Try-Gly-Lys-Pro-Val-Gly-Lys-Lys-Arg-Arg-$NH_2$ (1–18)

50 mg. of the protected octadecapeptide-amide prepared according to step 3 are subjected to the treatment described in Example 3 in order to remove the protecting groups. The free octadecapeptide-amide is obtained with almost quantitative yields.

EXAMPLE 9

Synthesis of the Corticotropine-Fragment (1–19 Amide)

Step 1: Z-Lys(BOC)-Lys(BOC)-Arg($NO_2$)-Arg($NO_2$)-Pro-$NH_2$ (15–19)

(a) 1.0 g. of the protected pentapeptide-p-nitrophenyl-ester prepared according to Example 1 step 17(a) is dissolved in 10 ml. of methanol, the solution is admixed with 3 ml. of a concentrated ammonia solution and allowed to stand at room temperature overnight. The reaction mixture is evaporated, the residue is dissolved in a mixture of chloroform and water, the chloroform layer is separated, washed with water, dried and evaporated. The residue is subjected to chromatography on a silica gel column by using a mixture of chloroform, methanol and water (40:10:1). The fractions containing the main-product are combined, evaporated and the residue is triturated with ether. Thus 0.8 g. of the protected pentapeptide-amide are obtained (yield: 89%); $R_f^2$ 0.25–0.35; $R_f^8$ 0.30–0.40.

(b) 0.41 g. of the protected pentapeptide-pentachlorophenyl-ester prepared according to Example 1 step 17(b) are dissolved in 4.1 ml. of methanol and amidated by adding 1.2 ml. of a concentrated ammonia solution. The reaction-mixture is worked up as described in paragraph (a); thus 0.24 g. of the protected pentapeptide-amide are obtained (yield: 74%). This product is identical with the substance obtained according to paragraph (a).

Step 2: H-Lys(BOC)-Lys(BOC)-Arg-Arg-Pro-$NH_2$·3HCl (15–19)

0.5 g. of the protected pentapeptide-amide prepared according to step 1 are subjected to hydrogenolysis in 45 ml. of glacial acetic acid in the presence of a palladium charcoal catalyst. After completion of the reaction, the catalyst is filtered off and the filtrate is evaporated. The residue is dissolved in chloroform, the solution is admixed with 0.3 g. of pyridine hydrochloride and the product is precipitated by adding ether. The precipitate is dissolved in 0.5 ml. of a 60:38 mixture of chloroform and methanol, whereupon the solution is subjected to chromatography on a silica gel column by using a mixture of chloroform, methanol and water (60:38:10). The fractions containing the main-product are combined, evaporated and the residue is triturated with ether. Thus 0.4 g. of the pentapeptide-trihydrochloride are obtained (yield: 89%); $R_f^3$ 0.5–0.6.

Step 3: BOC-Ser-Tyr-Ser-Met-Glu(OBu$^t$)-His-Phe-Arg-Try - Gly - Lys(BOC) - Pro - Val - Gly - Lys(BOC)-Lys(BOC)-Arg-Arg-Pro-$NH_2$ (1–19)

197 mg. of the protected tetradecapeptide-hydrochloride prepared according to Example 1 step 36, 149 mg. of the pentapeptide trihydrochloride obtained as described in the preceding step 2, 56 mg. of pentachlorophenol and 45 mg. of dicyclohexyl carbodiimide are dissolved in 0.5 ml. of dimethylformamide containing 15 mg. of triethylamine. The reaction mixture is allowed to stand at room-temperature for 2 days, whereupon it is diluted with ether free of peroxide. The precipitate thus obtained is passed through a silica gel column which is then eluted with a mixture of ethyl acetate, pyridine, formic acid and water (40:20:6:5.5). After carrying out the usual purification 144 mg. of the protected nonadecapeptide-amide are obtained (yield: 50%); $R_f^5$ 0.20–0.26.

Step 4: H-Ser-Tyr-Ser-Met-Glu-His-Phe-Arg-Try-Gly-Lys-Pro-Val-Gly-Lys-Lys-Arg-Arg-Pro-$NH_2$ (1–19)

100 mg. of the protected nonadecapeptide-amide prepared according to step 3 are treated as described in Example 3 in order to remove the protective groups. Thus 60 mg. of the free nonadecapeptide-amide are obtained (yield: about 70%); $R_f^6$ 0.30–0.40.

EXAMPLE 10

Synthesis of the Corticotropine-Fragment (1–20)-Amide

Step 1: Z-Lys(BOC)-Lys(BOC)-Arg($NO_2$)-Arg($NO_2$)-Pro-Val-$NH_2$ (15–20)

584.8 g. of the protected pentapeptide-pentachlorophenyl-ester prepared according to Example 1 step 17(b) and 0.15 g. of valine-amide are dissolved in 1.0 ml. of dimethylformamide and the solution is allowed to stand at room-temperature for 2 days. The reaction-mixture is evaporated and the residual oil is purified by chromatography on a silica gel column by using a mixture of ethyl acetate, pyridine, acetic acid and water (60:10:3:3.5). Thus 320 mg. of the pure protected hexapeptide-amide are obtained, $R_f^2$ 0.4–0.5.

The above protected hexapeptide-amide may also be prepared in a similar way by reacting 500 mg. of the protected pentapeptide-p-nitro-phenyl-ester prepared according to Example 1 step 17(a) with 80 mg. of valinamide-hydrochloride and 50 mg. of triethylamine, on carrying out the usual chromatographic separation 430 mg. of the protected hexapeptide-amide are obtained (yield: 88%); $R_f^2$ 0.4–0.5.

Step 2: H-Lys(BOC)-Lys(BOC)-Arg-Arg-Pro-Val-$NH_2$.3HCl (15–20)

0.2 g. of the hexapeptide-amide prepared according to step 1 are subjected to hydrogenolysis in 10 ml. of glacial acetic acid in the presence of a palladium-charcoal catalyst. After completion of the reaction the catalyst is filtered off and the filtrate is evaporated. The residue is dissolved in chloroform, the solution is admixed with 0.12 g. of pyridine hydrochloride and the product is precipitated by addition of ether. The precipitate is dissolved in 0.1 ml. of a mixture of chloroform and methanol (60:38) and the solution is subjected to chromatography on a silica gel column by using a mixture of chloroform, methanol and water (60:38:10). Thus 0.17 g. of the hexapeptide-trihydrochloride are obtained (yield: 100%); $R_f^3$ 0.42–0.50.

Step 3: BOC-Ser-Tyr-Ser-Met-Glu(OBu$^t$)-His-Phe-Arg-Try-Gly-Lys(BOC)-Pro-Val-Gly-Lys(BOC)-Lys(BOC)-Arg-Arg-Pro-Val-$NH_2$ (1–20)

197 mg. of the protected tetradecapeptide-hydrochloride prepared according to Example 1 step 36, 128 mg. of the hexapeptide-trihydrochloride obtained as shown in the above step 2, 56 mg. of pentachlorophenol and 45 mg. of dicyclohexyl-carbodiimide are dissolved in 0.5 ml. of dimethylformamide containing 11.7 mg. of triethylamine. The reaction mixture is allowed to stand for 2 days, whereupon it is diluted with ether free of peroxide and the resulting precipitate is subjected to chromatography on a silica gel column by using a mixture of ethyl acetate, pyridine, formic acid and water (40:20:6:5.5). The fractions containing the pure main product are combined, evaporated and the residue is triturated with ethyl acetate. Thus 185 mg. of the protected icosapeptide-amide are obtained (yield: 61%); $R_f^5$ 0.27–0.34.

Step 4: H-Ser-Tyr-Ser-Met-Glu-His-Phe-Arg-Try-Gly-Lys-Pro-Val-Gly-Lys-Lys-Arg-Arg-Pro-Val-$NH_2$ (1–20)

100 mg. of the protected icosapeptide-amide prepared according to step 3 are subjected to the treatment described in Example 3 in order to remove the protective groups. Thus 75 mg. of the free icosapeptide-amide are obtained (yield: 87%); $R_f^6$ 0.22–0.25.

EXAMPLE 11

Synthesis of the Corticotropine-Fragment (1–21-Amide)

Step 1: Z-Lys(BOC)-Lys(BOC)-Arg($NO_2$)-Arg($NO_2$)-Pro-Val-Lys(BOC)-$NH_2$ (15–21)

(a) 0.5 g. of the protected pentapeptide-p-nitro-phenyl-ester prepared according to Example 1 step 17(a) Z-Lys(BOC)-Lys(BOC)-Arg($NO_2$)-Arg($NO_2$)-Pro-ONP are reacted with 0.17 g. of the dipeptide-amide H-Val-Lys-(BOC)-$NH_2$ (see K. Sturm, R. Geiger and W. Siedel: Ber. 97, 1197 /1964/) in 1.0 ml. of dimethylformamide. After 2 days the reaction mixture is diluted with ether. The precipitate is subjected to chromatography on a silica gel column by using a mixture of ethyl acetate, pyridine, acetic acid and water (60:10:3:5.5). Thus 0.52 g. of the protected heptapeptide-amide are obtained (yield: 89%).

(b) 877 g. of the protected pentapeptide-pentachlorophenylester prepared according to Example 1 step 17(b) are dissolved in 1.5 ml. of dimethylformamide, the solution is admixed with 478 mg. of the dipeptide-amide H-Val-Lys(BOC)-$NH_2$ and the reaction mixture is allowed to stand at room temperature for 2 days. The reaction product is precipitated with ether and purified on silica gel. Thus 713 mg. of the protected heptapeptide-amide are obtained (yield: 77%); $R_f^2$ 0.61–0.72; $R_f^1$ 0.35–0.40.

Step 2: H-Lys(BOC)-Lys(BOC)-Arg-Arg-Pro-Val-Lys(BOC)-$NH_2$.3HCl (15–21)

0.4 g. of the protected heptapeptide-amide prepared according to step 1 are subjected to hydrogenolysis in 25 ml. of glacial acetic acid in the presence of a palladium-charcoal catalyst. After completion of the reaction the catalyst is filtered off, the solution is evaporated and the residue is dissolved in chloroform. The chloroform solution is admixed with 0.3 g. of pyridine hydrochloride, the product is precipitated with ether and dissolved in 0.5 ml. of a mixture of chloroform and methanol (60:26). The solution is subjected to chromatography on a silica gel column by using a 60:26:5 mixture of chloroform, methanol and water. The fractions containing the pure main product are combined, evaporated and the residue is triturated with ether. Thus 0.35 g. of the heptapeptide-trihydrochloride are obtained (yield: 89%); $R_f^1$ 0.07–0.10; $R_f$ 0.45–0.50 in a system of chloroform, methanol and water (60:26:5).

Step 3: BOC-Ser-Tyr-Ser-Met-Glu(OBu$^t$)-His-Phe-Arg-Try-Gly-Lys(BOC)-Pro-Val-Gly-Lys(BOC)-Lys(BOC)-Arg-Arg-Pro-Val-Lys(BOC)-$NH_2$ (1–21)

197 mg. of the protected tetradecapeptide-hydrochloride prepared according to Example 1 step 36, 152 mg. of the heptapeptide-amide-trihydrochloride obtained as described in the preceding step 2, 52 mg. of pentachlorophenol and 44 mg. of dicyclohexyl-carbodiimide are dissolved in 0.5 ml. of dimethylformamide containing 11 mg. of triethylamine. The reaction mixture is allowed to stand at room-temperature for 2 days, whereupon it is diluted with ether free of peroxide and the precipitate is subjected to chromatography on a column containing 10 g. of silica gel by using a solvent system of ethyl acetate, pyridine, formic acid and water (40:20:6:5.5). The product is worked up in the usual way. Thus 200 mg. of the protected heneisosapeptide amide are obtained (yield: 61%); $R_f^5$ 0.35–0.40.

Step 4: H-Ser-Tyr-Ser-Met-Glu-His-Phe-Arg-Try-Gly-Lys-Pro-Val-Gly-Lys-Lys-Arg-Arg-Pro-Val-Lys-$NH_2$ (1–21)

The protective groups of 100 mg. of protected heneicosapeptide-amide prepared according to the above step 3 are removed by the method described in Example 3. Thus 75 mg. of the free heneicosapeptide-amide are obtained (yield: 80%); $R_f^6$ 0.20–0.25.

EXAMPLE 12

Synthesis of the Fragment (1–28) of Pig-Corticotropine

Step 1: Z-Gly-Ala-Glu(OBu$^t$)-OBu$^t$ (26–28B)

58.1 g. of the protected active alanine-ester Z-Ala-OSu (wherein Su represents the succinimide radical) are dissolved in 150 ml. of anhydrous dioxane and the resulting solution is added to a solution of 54.4 g. of the glutamic acid ester H-Glu(OBu$^t$)-OBu$^t$ in anhydrous dioxane. The reaction-mixture is allowed to stand at room-temperature for an hour, whereupon it is admixed with 1 litre of ethyl acetate and extracted successively with water, N hydrochloric acid, a 8% sodium hydrogen carbonate solution and water. The organic layer is dried and hydrogenated in the presence of a palladium-charcoal catalyst. The free dipeptide-ester thus obtained is extracted with a 10% citric acid solution. The aqueous solution is made alkaline with sodium carbonate to pH=9 and the precipitated oily dipeptide ester is extracted with ether. The ether is distilled off, whereupon the residual dipeptide-ester H-Ala-Glu(OBu$^t$)-OBu$^t$ is dissolved in 1 litre of ethyl acetate and admixed with 45.8 g. of the active glycine-ester Z-Gly-OSu. The reaction-mixture is allowed to stand at room-temperature until next day whereupon it is extracted successively with N hydrochloric acid, a 8% sodium hydrogen carbonate solution and water, dried and the ethyl acetate is distilled off. The oily residue sets solid on standing under petroleum ether. The product is recrystallized from 250 ml. of diisopropylether. Thus 65–66.5 g. of the protected tripeptide-ester are obtained (yield: 83–85%); M.P.: 105–107° C.; $[\alpha]_D^{20}$= —32.5° to —35.7° (c.=1, in ethanol).

Step 2: Z-Asp(OBu$^t$)-OSu (25 B)

58.6 g. of the finely powdered dicyclohexylamine salt of Z-Asp(OBu$^t$)-OH are suspended in 250 ml. of ether in a separating funnel, whereupon a mixture of 3.3 ml. concentrated sulfuric acid and 200 ml. of water is added and the mixture is shaken until the dissolution of the salt is complete. The aqueous layer is extracted with ether, the united ethereal solutions are washed with water, dried and the ether is distilled off. The residual oil is dissolved in 250 ml. of anhydrous dioxane and admixed with 13.4 g. of N-hydroxy-succinimide and 22.4 g. of dicyclohexyl-carbodiimide under cooling with ice-water. The mixture is allowed to stand until next day, whereafter the dicyclo-hexyl-urea is filtered off, the filtrate is evaporated in vacuo and the residual oil is set solid under petroleum ether. After recrystallizing from 100 ml. of isopropanol 35–40 g. of the protected active aspartic acid ester are obtained (yield: 72–83%); M.P. 148–150° C.

Step 3: Z-Asp(OBu$^t$)-Gly-Ala-Glu(OBu$^t$)-OBu$^t$ (25–28B)

46 g. of the protected tripeptide Z-Gly-Ala-Glu(OBu$^t$)-OBu$^t$ prepared according to step 1 are dissolved in 550 ml. of 80% acetic acid and subjected to hydrogenolysis in the presence of a palladium-charcoal catalyst. The catalyst is filtered off, the solution is evaporated in vacuo and the residual oil is dissolved in 500 ml. of water. The resulting solution is admixed with 120 g. of sodium chloride and made alkaline to pH=9 by adding sodium carbonate. The precipitated oil is extracted with ethyl acetate, whereupon the ethyl acetate is dried and evaporated. The residue is dissolved in a mixture of 200 ml. of anhydrous ethyl acetate and 100 ml. of anhydrous dioxane, whereupon the solution is admixed with 30.6 g. of the active ester Z-Asp(OBu$^t$)OSu. After standing for 3 hours the reaction-mixture is diluted with 200 ml. of water and washed successively with water, N hydrochloric acid, a 8% sodium hydrogen carbonate solution and water, then dried and evaporated in vacuo. The residual oil becomes crystalline on standing under petroleum ether; thus 38–40 g. of the protected tetrapeptide-ester are obtained (yield: 75–79%); M.P. 80–83° C.

Step 4: H-Val-Lys(BOC)-Val-Tyr(Bu$^t$)-Pro-Asp(OBu$^t$)-Gly-Ala-Glu(OBu$^t$)-OBu$^t$ (20–28)

37.2 g. of the protected tetrapeptide-ester Z-Asp(OBu$^t$)-Gly-Ala-Glu(OBu$^t$)-OBu$^t$ prepared according to step 3 are dissolved in 400 ml. of 80% acetic acid and subjected to hydrogenolysis in the presence of a palladium-charcoal catalyst. The catalyst is filtered off, the filtrate is evaporated in vacuo, whereupon the residual oil is dissolved in 330 ml. of water and the solution is made alkaline to ph=9 by adding sodium carbonate. The precipitated oil is extracted with ethyl acetate, the solution is dried and the solvent is distilled off in vacuo. The tetrapeptide-ester thus obtained is dissolved in 350 ml. of anhydrous dioxane and admixed with 48.9 g. of the protected active pentapeptide - ester Z - Val-Lys(BOC)-Val-Tyr(Bu$^t$)-Pro-OSu prepared according to Example 2 step 1. The reaction mixture is allowed to stand at room-temperature for 20 hours, thereupon it is evaporated in vacuo and the residue is dissolved in 700 ml. of ethyl acetate. The resulting solution is washed successively with water, N hydrochloric acid, a 8% sodium hydrogen carbonate solution and water, then dried and evaporated in vacuo. The crude carbobenzoxy-nonapeptide-ester thus obtained is dissolved in 1 litre of 80% acetic acid and subjected to hydrogenolysis in the presence of a palladium-charcoal catalyst. The catalyst is filtered off, the solvent is removed in vacuo, the residue is dissolved in 1 litre of ethyl acetate, the solution is washed twice with 150 ml. of a 10% citric acid solution each and then with a 5% sodium carbonate solution, whereafter it is dried and the ethyl acetate is distilled off. The residual resin is smelling of the solvent and is triturated with petroleum ether, filtered and dried in vacuo over phosphorous pentoxide. Thus 49.5 g. of the nonane-peptide-ester are obtained (yield: 77%); M.P.: 135–140° C. $\lambda$=268 m$\mu$; log $\epsilon$=2.71 (in ethanol).

*Analysis.*—C$_{65}$H$_{108}$N$_{10}$O$_{17}$ (1301.60). Calc. (percent): C, 59.98; H, 8.36; N, 10.76. Found (percent): C, 59.25; H, 8.70; N, 10.66.

Step 5: Z-Lys(BOC)-Lys(BOC)-Arg(NO$_2$)-Arg(NO$_2$)-Pro - Val - Lys(BOC)-Val-Tyr(Bu$^t$)-Asp(OBu$^t$)-Gly-Ala-Glu(OBu$^t$)-OBu$^t$ (15–28)

451 mg. of the nonapeptide prepared according to step 4 and 426 mg. of the protected pentapeptide-p-nitrophenyl-ester prepared according to Example 1 step 17(a) are dissolved in 0.7 ml. of dimethylformamide and the solution is allowed to stand at room-temperature for 2 days. The reaction-mixture is then triturated with ether and the product thus obtained is precipitated successively four times from a mixture of ethyl acetate and ether. Thus 735 mg. (yield: 88.5%) of the protected tetradecapeptide-ester are obtained; R$_f^2$ 0.75–0.85; R$_f^4$ 0.26–0.36; $[\alpha]_D^{20}$= —65.7° (C.=1, in methanol).

*Analysis.*—C$_{112}$H$_{183}$O$_{32}$N$_{25}$ (2391.78). Calc. (percent): C, 56.2; H, 7.7; N, 14.6. Found (percent): C, 56.05; H, 7.8; N, 14.5.

Step 6: H-Lys(BOC)-Lys(BOC) - Arg - Arg-Pro-Val-Lys(BOC)-Val-Tyr(Bu$^t$) - Pro - Asp(OBu$^t$)-Gly-Ala-Glu(OBu$^t$)-OBu$^t$.3HCl (15–28)

6.1 g. of the protected tetradecapeptide-ester prepared according to step 5 are hydrogenated in 300 ml. of glacial acetic acid in the presence of a palladium-charcoal catalyst. After completion of the reaction the catalyst is filtered off, the solution is evaporated, the residue is dissolved in 50 ml. of water and the resulting solution is admixed with 20 ml. of 0.5 N hydrochloric acid under cooling with ice-water. The peptide is precipitated from the aqueous solution on addition of 10 ml. of a saturated sodium chloride solution. The product is filtered off and dried. The dry product is triturated with a mixture of 80 ml. of chloroform and 80 ml. of ethanol, whereupon the insoluble inorganic salts are removed by filtration, the solution is evaporated and the residue is subjected to chromatography on a silica gel column by using a mixture of chloroform, methanol and water (60:26:5). The fractions containing the main-product are combined, evaporated and the residue is triturated with ether. Thus 4.35 g. of the tetradecapeptide-tri-hydrochloride are obtained (yield: 76%); $R_f^7$ 0.37–0.47; $R_f^9$ 0.55–0.60.

Analysis.—$C_{104}H_{182}O_{26}N_{23}Cl_3$ (2277.05). Calc. (percent): N, 14.2; Cl, 4.65. Found (percent): N, 14.15; Cl, 4.65.

Amino acid analysis: Ala 0.95 (1), Arg 2.05 (2), Asp 1.0 (1), Glu 1.05 (1), Gly 1.0 (1), Lys 2.85 (3), Pro 2.05 (2), Tyr 1.0 (1), Val 2.05 (2).

Step 7: BOC-Ser-Tyr - Ser-Met-Glu(OBu$^t$)-His-Phe-Arg-Try-Gly-Lys(BOC) - Pro - Val - Gly - Lys(BOC)-Lys (BOC)-Arg-Arg-Pro - Pro - Val - Lys(BOC) - Val-Tyr (Bu$^t$)-Pro-Asp(OBu$^t$)-Gly-Ala-Glu(OBu$^t$) - OBu$^t$ (1–28)

0.986 g. of the tetradecapeptide-hydrochloride prepared according to Example 1 step 36, 1.38 g. of the tetradecapeptide - tri - hydrochloride obtained as described in the above step 6, 0.266 g. of pentachlorophenol and 0.206 g. of dicyclohexyl-carbodiimide are dissolved in 3.0 ml. of dimethylformamide containing 50 mg. of triethylamine. The reaction-mixture is allowed to stand at room-temperature for 2 days, whereupon it is diluted with ether free of peroxide and the precipitate obtained is subjected to chromatography on a silica gel column by using a 60:20:6:5.5 mixture of ethyl acetate, pyridine, formic acid and water. The fractions containing the pure main-product are combined and evaporated. The further fractions also containing the main-product are combined separately, evaporated and subjected once more to chromatography. Thus a further amount of the pure protected octacosapeptide is obtained. Thus a total amount of 0.85 g. of the protected octacosapeptide are obtained (yield: about 40%); $R_f^7$ 0.17–0.25.

Step 8: H - Ser - Tyr-Ser-Met-Glu-His-Phe-Arg-Tyr-Gly-Lys-Pro-Val-Gly-Lys-Lys-Arg - Arg - Pro-Val-Lys-Val-Tyr-Pro-Asp-Gly-Ala-Glu-OH (1–28)

760 mg. of the protected octacosapeptide prepared according to step 7 are dissolved in 20 ml. of 90% trifluoro-acetic acid containing 0.02% of mercapto-ethanol. The solution is allowed to stand for 15 minutes, then evaporated, the residue is dissolved in 3 ml. of water and the resulting solution is evaporated again. The dissolution in water and the evaporation is repeated. The product is dissolved finally in 5 ml. of water and the solution is passed through a column containing 20 ml. of an Amberlite IRA–400 ionexchange-resin (in the acetate-cycle). The column is washed six times with 5 ml. of water each and the aqueous solutions obtained are dried by lyophilization. Thus 580 mg. of the free octacosapeptide are obtained (yield: about 90%); $R_f^6$ 0.30–0.35.

Amino acid analysis: Asp 1.0 (1), Ser 2.0 (2), Glu 2.03 (2), Pro 3.04 (3) Gly 3.1 (3), Ala 1.05 (1), Val 3.09 (3), Met 0.97 (1), Tyr 2.12 (2), Phe 1.0 (1), His 1.2 (1), Lys 3.9 (4), Arg 2.91 (3).

EXAMPLE 13

Synthesis of the Fragment (1–28) of Human Corticotropine

Step 1: Z-Ala-Gly-Glu(OBu$^t$)$_2$ (26–28)

11.9 g. of Z-GlyOSu are dissolved in 170 ml. of ethyl acetate, the solution is cooled to 0° C. and added to a cooled solution of 12.2 g. of H-Glu(OBu$^t$)$_2$ in 60 ml. of ethyl acetate. The reaction mixture is allowed to stand overnight, whereupon it was extracted successively with N hydrochloric acid, a 5% sodium hydrogen carbonate solution and water. The ethyl acetate solution is dried and the solvent is distilled off. The oily residue consists of Z-Gly-Glu(OBu$^t$)$_2$ (Analysis: calc: C 61.4%, H 7.6%, O 24.9%; found: C 60.8%, H 7.6%, O 24.5%), which is dissolved in 200 ml. of ethyl acetate without further puridification and hydrogenated in the presence of a palladium-charcoal catalyst until the $CO_2$-reaction is stopped. The chromatographically uniform dipeptide-ester H-Gly-Glu(OBu$^t$)$_2$ thus obtained ($R_f^1$ 0.7 ninhydrine) is extracted with a 10% citric acid solution and the aqueous solution is made alkaline to pH 9. The precipitated oil is extracted with ethyl acetate, the ethyl acetate solution is dried and admixed with a solution of 11.1 g. of Z-Ala-OSu and 150 ml. of ethyl acetate at 0° C. The mixture is allowed to stand at room temperature for 24 hours, extracted first with N hydrochloric acid, then with a 5% sodium hydrogen carbonate solution and water, whereupon it is dried and evaporated in vacuo. The residual solid foam is triturated with a mixture of ether and petroleum ether and filtered. Thus 13.2 g. of the crude protected tripeptide-ester are obtained (yield: 53%). After recrystallization from a mixture of ethyl acetate and petroleum ether 11.8 g. of the purified product are obtained in the form of needle crystals. M.P.: 63–66° C.

Analysis.—$C_{26}H_{39}O_8N_3$ (521.59). Calc. (percent): C, 59.9; H, 7.5; N, 8.0. Found (percent): C, 59.6; H, 7.7; N, 7.8.

Step 2: Z-Asp(OBu$^t$)-Ala-Gly-Glu(OBu$^t$)$_2$ (25–28)

4.8 g. of the protected tripeptide-ester Z-Ala-Gly-Glu(OBu$^t$)$_2$ are dissolved in 60 ml. of 80% acetic acid and hydrogenated in the presence of a palladium-charcoal catalyst in the usual way. The catalyst is filtered off, the solvent is removed and the residual oily, chromatographically uniform ($R_f^1$ 0.5) product is dissolved in water containing sodium chloride. The pH of the solution is adjusted to 8 and the precipitated oil is extracted with ethyl acetate. The ethyl acetate solution is dried and admixed with 3.2 g. of Z-Asp(OBu$^t$)OSu at 0° C. The reaction mixture is allowed to stand overnight, washed in the usual manner and dried. The solvent is distilled off and the residue sets solid under petroleum ether. Thus 4.75 g. of the crude protected tetrapeptide-ester are obtained (yield: 74.6%). The product may be recrystallized from a mixture of ethyl acetate and petroleum ether. (M.P. 88–90° C.).

Analysis.—$C_{34}H_{52}O_{11}N_4$ (692.78), Calc. (percent): C, 58.9; H, 7.5; N, 8.1; O, 25.4. Found (percent): C, 58.2; H, 7.2; N, 8.2; O, 25.6.

Step 3: Z-Val-Lys(BOC)-Val-Tyr(Bu$^t$)-Pro-Asp (OBu$^t$)-Ala-Gly-Glu(OBu$^t$)$_2$ (20–28)

2.5 g. (3.6 millimoles) of the protected tetrapeptide-ester prepared according to step 2 are dissolved in 28 ml. of 80% acetic acid and hydrogenated in the presence of a palladium-charcoal catalyst until the carbon dioxide formation is stopped. The catalyst is filtered off, the filtrate is evaporated in vacuo and the residue is dissolved in 20 ml. of water. The aqueous solution is made alkaline to pH 9 by adding sodium carbonate and the precipitated tetrapeptide-ester is extracted three times with 20 ml. of ether each. The united ether solutions are dried and evaporated. Thus 1.8 g. of the oily crude product are obtained (yield: 90%).

The product thus obtained and 2.2 g. (2.2 millimoles) of the protected pentapeptide-N-hydroxy-succinimide-ester prepared according to Example 2 step 1 are dissolved in 25 ml. of anhydrous dioxane, the solution is allowed to stand for 2 days, evaporated in vacuo and the residue is dissolved in 50 ml. of ethyl acetate. The solution is extracted twice with 10 ml. of a 10% citric acid solution each and twice with 10 ml. of a 8% sodium hydrogen carbonate solution each. The precipitate formed by extraction is removed by filtration. The solution is dried over anhydrous sodium sulfate, the ethyl acetate is distilled off, the residue is slurried in petroleum ether and the mixture is filtered. Thus 3.15 g. of the crude protected nonapeptide-ester are obtained (yield: 100%);

M.P.: 140° C. (softens at 115° C.). After precipitating from a mixture of ethyl acetate and petroleum ether the melting point of the product amounts to 132–146° C.; $R_f^3$ 0.72.

*Analysis.*—$C_{73}H_{114}N_{10}O_{19}$ (1435.73). Calc. (percent): C, 60.0; H, 8.0; N, 9.8. Found (percent): C, 60.45; H, 8.24; N, 10.25.

Step 4: H-Val-Lys(BOC)-Val-Tyr(Bu$^t$)-Pro-Asp(OBu$^t$)-Ala-Gly-Glu(OBu$^t$)$_2$ (20.28)

3.1 g. (2.35 millimoles) of the protected nonapeptide-ester prepared according to step 3 are dissolved in 60 ml. of 80% acetic acid and hydrogenated in the presence of a palladium-charcoal catalyst. The carbon dioxide formation having stopped the catalyst is filtered off and the filtrate is evaporated in vacuo. The residue is dissolved in 50 ml. of ethyl acetate, the solution is washed successively four times with 10 ml. of a 8% sodium hydrogen carbonate solution each and with 10 ml. of a 10% sodium carbonate solution, then dried over anhydrous sodium sulfate and evaporated. The residue is set solid on standing under petroleum ether. The product is filtered and dried. Thus 1.7 g. of the free nonapeptide-ester are obtained (yield: 61%), M.P.: 101–112° C. (the product softens at 93° C.). $R_f^3$ 0.15.

Step 5: Z-Lys(BOC)-Lys(BOC)-Arg(NO$_2$)-Arg(NO$_2$)-Pro-Val-Lys(BOC) - Val - Tyr(Bu$^t$)-Pro-Asp(OBu$^t$)-Ala-Gly-Glu(OBu$^t$)$_2$ (15–28)

1.6 g. (1.23 millimoles) of the free nonapeptide-ester prepared according to step 4 and 1.66 g. (1.23 millimoles) of the protected pentapeptide-pentachlorophenyl-ester obtained according to Example 1 step 17(b) are dissolved in 2 ml. of dimethyl-formamide. The solution is allowed to stand for a day, whereupon it is diluted with anhydrous ether, the precipitated product is filtered off, washed with ether and dried. Thus 2.65 g. of the protected tetradecapeptide-ester are obtained (yield: 90%); $R_f^3$ 0.55.

Step 6: H-Lys(BOC)-Lys(BOC)-Arg-Arg-Pro-Val-Lys(BOC) - Val-Tyr(Bu$^t$)-Pro-Asp(OBu$^t$)-Ala-Gly-Glu(OBu$^t$)$_2$.3HCl(15–28)

2.65 g. (1.21 millimoles) of the protected tetradecapeptide-ester prepared according to step 5 are dissolved in 150 ml. of acetic acid and hydrogenated in the presence of a palladium-charcoal catalyst. The advancement of the reaction is controlled by means of thin layer chromatography. The reaction having been completed the catalyst is filtered off, the filtrate is evaporated, whereupon the residue is triturated with ether, filtered and dried. The crude product thus obtained (2.35 g.) is dissolved in 60 ml. of water, the solution is cooled with ice and acidified to pH 4 by adding 7.8 ml. of a 0.5 N hydrochloric acid solution. The tetradecapeptide-ester-trihydrochloride is precipitated on addition of 10 ml. of a saturated sodium chloride solution. The product is filtered, washed with a saturated sodium chloride solution and dried. The product containing also sodium chloride (1.45 g.) is dissolved in 20 ml. of ethanol, the solution is admixed with 20 ml. of chloroform and the precipitated sodium chloride is filtered off. On evaporating the solution 1.35 g. of the free tetradecapeptide-ester are obtained (yield: 53%); $R_f^1$ 0.35.

Step 7: BOC-Ser-Tyr-Ser-Met-Glu(OBu$^t$)-His-Phe-Arg-Try - Gly - Lys(BOC) - Pro-Val-Gly-Lys(BOC)-Lys(BOC) - Arg - Arg-Pro-Val-Lys(BOC)-Val-Tyr(Bu$^t$)-Pro - Asp(OBu$^t$)-Ala-Gly-Glu(OBu$^t$)$_2$.3HCOOH (1–28)

0.60 g. (0.305 millimole) of the protected tetradecapeptide prepared according to Example 1 step 36, 0.69 g. (0.305 millimole) of the tetradecapeptide-ester-trihydrochloride prepared according to the above step 6 and 0.48 g. (1.8 millimoles) of pentachlorophenol are dissolved in 2.0 ml. of dimethylformamide, the solution is admixed with 0.124 g. (0.6 millimole) of dicyclohexyl-carbodiimide and allowed to stand at room temperature overnight. The reaction mixture is neutralized with a solution of 0.3 ml. (0.125 millimole) of triethylamine and 1.5 ml. of dimethylformamide, whereupon it is allowed to stand a further day and diluted with ether free of peroxide. The precipitated product is filtered, washed with ether and dried. The crude product thus obtained (1.45 g.) is subjected to chromatography on a column containing 50 g. of silica gel by using a mixture of ethyl acetate, pyridine, formic acid and water (60:20:6:5:5). In every 20 minutes 3 fractions are collected. The pure protected octacosapeptide is isolated by evaporating fractions 79–10. Thus 0.7 g. of the pure product are obtained (yield: 13%); $R_f^7$ 0.30.

Step 8: H-Ser-Tyr-Ser-Met-Glu-His-Phe-Arg-Try-Gly-Lys-Pro - Val-Gly-Lys-Lys-Arg-Arg-Pro-Val-Lys-Val-Tyr-Pro-Asp-Ala-Gly-Glu-OH (1–28)

171 mg. of the protected octacosapeptide are dissolved in 5 ml. of 90% trifluoroacetic acid, the solution is allowed to stand for 15 minutes and evaporated. The residue is dissolved in 2 ml. of water and the solution is evaporated. This procedure is repeated, whereupon the residue is dissolved in 2 ml. of water and the solution is passed through a column containing 5 ml. of an Amberlite IRA–400 ionexchange resin of the acetate-cycle. The column is washed with 120 ml. of water and the combined liquids are lyophilized. Thus 127.5 mg. of the free octacospeptide are obtained (yield: 96%).

Amino acid analysis: Lys 3.86 (4), Arg 2.95 (3), His 1.2 (1), Asp 1.01 (1), Ser 2.05 (2), Glu 2.05 (2), Pro 2.9 (3), Gly 3.0 (3), Ala 0.97 (1), Val 2.85 (3), Met 0.96 (1), Tyr 1.77 (2), Phe 1.04 (1).

EXAMPLE 14

Synthesis of the Fragment (1–32) of Human Corticotropine

Step 1: Z-Ser-Ala-OBu$^t$ (31–32)

7.5 g. (29.5 millimoles) of Z-Ser-N$_2$H$_3$ are suspended in 80 ml. of dimethylformamide, the suspension is cooled to —10° C. and admixed first with 7.3 ml. of concentrated hydrocloric acid an then dropwise with a concentrated aqueous solution of 2.04 g. of sodium nitrite. The reaction mixture is stirred for 5 minutes, whereupon it is carefully made alkaline with 12.4 ml. of triethylamine and the resulting azide-solution is admixed with a solution of 4.5 g. (31 millimoles) of Ala-OBu$^t$ and 16 ml. of dimethylformamide. The mixture is stirred at —10° C. for an hour, whereupon it is allowed to stand at roomtemperature until next day. The solution is evaporated in vacuo and the residual oil is dissolved in a mixture of 150 ml. of ethyl acetate and 30 ml. of water. The solution is extracted successively three times with 30 ml. of a 10% citric acid solution, three times with 30 ml. of a 8% sodium hydrogen carbonate solution finally with 30 ml. of water. The organic phase is dried over anhydrous sodium sulfate and evaporated. The oily dipeptide-ester sets solid on standing under petroleum ether and filtered. Thus 8.4 g. of the protected dipeptide-ester are obtained (yield: 76%); after recrystallization from 10% ethanol the melting point amount to 63–65° C.

*Analysis.*—$C_{18}H_{22}N_2O_6+1/3 H_2O$ (372.42). Calc. (percent): C, 58.10; H, 7.25; N, 7.53. Found (percent): C, 58.18; H, 7.26; N, 7.80.

Step 2: H-Ser-Ala(OBu$^t$).HOOC—CH$_3$ (31–32)

10.0 g. (27.4 millimoles) of Z-Ser-Ala-OBu$^t$ are dissolved in 100 ml. of 80% acetic acid and hydrogenated in the presence of a palladium-charcoal catalyst. After the carbon dioxide formation has stopped the catalyst is filtered off and the filtrate is evaporated in vacuo. The oily residue sets solid on standing under ether and is filtered off. Thus 6.9 of the free dipeptide-ester-acetic are obtained (yield: 87%); M.P. 76–78° C.; $R_f^1$ 0.55.

Step 3: Z-Glu(NH₂)-OPCP (30)

14.0 g. (50 millimoles) of Z-Glu(NH₂), 13.3 g. (50 millimoles) of pentachlorophenol and 10.5 g. (50 millimoles) of dicyclohexyl-carbodiimide are dissolved in 150 ml. of dimethylformamide at 0° C. The reaction mixture is allowed to stand at 0° C. for an hour, whereupon it is allowed to warm up to room-temperature. Next day the dicyclohexyl-urea is filtered off and the solution is evaporated in vacuo. The crystalline residue obtained is slurried in ether and filtered. Thus 17.27 g. of the active ester are obtained (yield: 65%); M.P.: 179–181° C.

Step 4: Z-Glu(NH₂)-Ser-Ala-OBu$^t$ (30–32)

4.2 g. (14.4 millimoles) of the dipeptide-ester-salt H-Ser-Ala-OBu$^t$-acetate and 7.6 g. (14.4 millimoles) of the Z-Glu (NH₂)-OPCP are dissolved in a mixture of 5 ml. of anhydrous pyridine and 30 ml. of dimethylformamide. The reaction mixture is allowed to stand for 20 hours and then evaporated in vacuo. The residual oil is taken up in ether, washed with a 8% sodium hydrogen carbonate solution and water, and then dried. Thus 4.8 g. of the protected tripeptide-ester are obtained (yield: 67.5%); M.P.: 183–185° C. After recrystallization from water the pure ester melts at 196–197° C. (it softens at 193° C.).

*Analysis.*—$C_{23}H_{34}N_4O_8$ (494.63). Calc. (percent): N, 11.35. Found (percent): N, 11.33.

Step 5: Z-Asp(OBu)$^t$-Glu(NH₂)-Ser-Ala-OBu$^t$ (29–32)

4.1 g. (8.3 millimoles) of the protected tripeptide-ester Z-Glu(NH₂)-Ser-Ala-OBu$^t$ are dissolved in 400 ml. of methanol under warming, whereupon the solution is cooled to room temperature, admixed with a methanolic solution of 300 mg. (8.3 millimoles) of hydrogen chloride and hydrogenated in the presence of a palladium-charcoal catalyst until the carbon dioxide formation is stopped. The catalyst is then filtered off and the filtrate is evaporated in vacuo. The residual solid foam is dissolved in 32 ml. of dimethylformamide, whereupon the solution is admixed with 3.45 g. (8.2 millimoles) of the active ester Z-Asp(OBu$^t$)-ONSu and 1.16 ml. (8.3 millimoles) of triethylamine. The reaction-mixture is allowed to stand for 2 days, whereupon it is evaporated and the oily residue sets solid by treatment with ether. The product is filtered off, washed successively with ether, a 8% sodium hydrogen carbonate solution and water, then dried. Thus 4.8 g. of the protected tetrapeptide-ester are obtained (yield: 87.5%); M.P. 181–183° C.

*Analysis.*—$C_{31}H_{47}N_5O_4$ (665.75). Calc. (percent): C, 55.9; H, 7.10; N, 10.60. Found (percent): C, 55.9; H, 7.20; N, 10.60.

Step 6: Z-Glu(OBu$^t$)-Asp(OBu$^t$)-Glu(NH₂)-Ser-Ala-OBu$^t$ (28–32)

6.0 g. (9 millimoles) of the protected tetrapeptide-ester prepared according to step 5 are dissolved in 100 ml. of 80% acetic acid and hydrogenated in the presence of a palladium-charcoal catalyst until the carbon dioxide formation is stopped. The catalyst is filtered off, the filtrate is evaporated and the residual oily tetrapeptide-ester is admixed with 20 ml. of ethanol. The alcohol is then distilled off and this procedure is repeated. The residue is dissolved in 20 ml. of dimethylformamide and admixed with 5.3 g. (9.0 millimoles) of the protected active ester Z-Glu(OBu$^t$)-OPCP. The reaction mixture is allowed to stand at room-temperature overnight, then evaporated in vacuo, whereupon the residue is triturated with ether, filtered, washed on the filter successively with ether, a 8% sodium hydrogen carbonate solution and water and then dried. Thus 6.6 g. of the protected pentapeptide-ester are obtained. (yield: 86%); M.P.: 170–173° C.; $R_f^3$ 0.65.

*Analysis.*—$C_{40}H_{62}N_6O_{14}$ (850.97). Calc. (percent): C, 56.4; H, 7.35; N, 9.90. Found (percent): C, 55.8; H, 7.45; N, 9.75.

Step 7: Z-Val-Lys(BOC)-Val-Tyr(Bu$^t$)-Pro-Asp(OBu$^t$)-Ala-Gly-Glu(OBu$^t$)-Asp(OBu$^t$) - Glu(NH₂)$^t$Ser - Ala-OBu$^t$ (15–32)

1.2 g. (1.4 millimoles) of the protected pentapeptide-ester prepared according to step 6 are dissolved in 50 ml. of ethanol and hydrogenated in the presence of a palladium-charcoal catalyst in the usual manner. The catalyst is filtered off, and the filtrate is evaporated. The residue and 1.68 g. (1.4 millimoles) of the N-hydroxysuccinimide-ester of the protected octapeptide prepared according to Example 2 step 2 are dissolved in 10 ml. of dimethylformamide. The reaction mixture is allowed to stand overnight, then evaporated, the residue is triturated with water, filtered and washed on the filter with a 8% sodium hydrogen carbonate solution and water. Thus 2.25 g. of the crude protected tridecapeptide-ester are obtained (yield: 85%); $R_f^3$ 0.55. Thin layer chromatogpeptide-ester and 1.44 g. (1.06 millimoles) of the protected octapeptide as impurity ($R_f^3$ 0.15).

Step 8: Z-Lys(BOC)-Lys(BOC)-Arg(NO₂)-Arg(NO₂)-Pro-Val-Lys(BOC)-Val-Tyr(Bu$^t$) - Pro - Asp(OBu$^t$)-Ala-Gly-Glu(OBu$^t$)-Asp(OBu$^t$)-Glu(NH₂) - Ser-Ala-OBu$^t$ (15–32)

2.25 g. (1.19 millimoles) of the protected tridecapeptide-ester prepared according to step 7 are dissolved in 50 ml. of ethanol and hydrogenated in the presence of a palladium-charcoal catalyst. The catalyst is filtered off and the filtrate is evaporated. The residual free tridecapeptide-ester and 1.44 g. (1.06 millimoles) of the protected pentapeptide-pentachlorophenyl-ester prepared according to Example 1 step 17(b) are dissolved in 5 ml. of dimethylformamide. The mixture is allowed to stand for a day, then evaporated in vacuo and the residue sets solid on standing under anhydrous ether. The product is filtered, washed with ether and dried. Thus 2.75 g. of the crude product are obtained (yield: 91%), which is then dissolved in 10 ml. of ethyl acetate. The solution is passed through a column (diameter=2 cm.) containing 60 g. of silica gel and the column is eluted with a mixture of ethyl acetate, pyridine, acetic acid and water (120:10:3: 5.5). In every 20 minutes fractions of 3 ml. are collected. 0.3 g. of the protected octadecapeptide are obtained by evaporating the combined fractions 129–141; $R_f^2$ 0.35.

Step 9: H-Lys(BOC)-Lys(BOC)-Arg-Arg-Pro-Val-Lys(BOC)-Val-Tyr(Bu$^t$) - Pro - Asp(OBu$^t$)-Ala-Gly-Glu(OBu$^t$)-Glu(NH₂)-Ser-Ala-OBu$^t$.3HCl (15–32)

300 mg. of the protected octadecapeptide-ester prepared according to step 8 are dissolved in 20 ml. of 80% acetic acid and hydrogenated in the presence of a palladium-charcoal catalyst. The advancement of the reaction is controlled by means of thin layer chromatography. The reaction having been completed the solution is filtered, the filtrate is evaporated in vacuo and the residue is triturated with anhydrous ether, filtered and dried. The octadecapeptide-acetate thus obtained is dissolved in 7 ml. of 0.2 N hydrochloric acid at 0° C. and the product is precipitated by adding 7 ml. of a saturated sodium chloride solution. Thus 144 mg. of the octadecapeptide-trihydrochloride are obtained (yield: 50%); $R_f^1$ 0.40.

Step 10: BOC-Ser-Tyr-Ser-Met-Glu(OBu$^t$)-His-Phe-Arg-Try-Gly-Lys(BOC) - Pro - Val - Gly - Lys(BOC)-Lys(BOC)-Arg-Arg-Pro - Val - Lys(BOC)-Val-Tyr(Bu$^t$)-Pro-Asp(OBu$^t$) - Ala - Gly - Glu(OBu$^t$) - Asp(OBu$^t$)-Glu(NH₂)-Ser-Ala-OBu$^t$.3HCOOH (1–32)

120 mg. (0.60 millimole) of the protected tetradecapeptide prepared according to Example 1 step 36, 144 mg. (0.053 millimole) of the octadecapeptide-ester-trihydrochloride obtained as described in the above step 9, 97 mg. (0.36 millimole) of pentachlorophenol and 25 mg.

(0.12 millimole) of dicyclohexyl-carbodiimide are dissolved in 0.4 ml. of dimethylformamide. The mixture is allowed to stand for a day, whereupon it is admixed with a solution of 0.06 ml. (0.43 millimole) of triethylamine and 0.4 ml. of dimethylformamide and allowed to stand for a further day. The product is precipitated by adding ether free of peroxide, then filtered, washed with ether and dried. The crude product (270 mg.) thus obtained is subjected to chromatography on a column containing 8 g. of silica gel by using a mixture of ethyl acetate, pyridine, formic acid and water (60:20:6:5.5). In every minute a fraction of 0.5 ml. is collected. The main-product is obtained by evaporating fractions 109–135. Thus 24 mg. of the protected dotriacontapeptide are obtained (yield: 10%; $R_f^7$ 0.2.

Step 11: H-Ser-Tyr-Ser-Met-Glu-His-Phe-Arg-Try-Gly-Lys-Pro - Val - Gly-Lys-Lys-Arg-Arg-Pro-Val-Lys-Val-Tyr-Pro-Asp-Ala-Gly-Glu-Asp - Glu(NH$_2$) - Ser - Ala-OH (1–32)

17 mg. of the protected dotriacontapeptide prepared according to step 10 are dissolved in 0.5 ml. of 90% trifluoroacetic acid and after 15 minutes the solvent is distilled off in vacuo. The residue is dissolved in 0.5 ml. of water, the solution is evaporated and this procedure is repeated. The residue is finally dissolved in 0.5 ml. of water and the solution is passed through a column containing 8 ml. of an Amberlite IRA–400 ion exchange resin of the acetate cycle. The column is washed with 10 ml. of water and the united aqueous solutions are lyophilized. Thus 11 mg. of the free dotriacontapeptide are obtained (yield: 80%); $R_f^8$ 0.45.

Amino acid analysis: Lys 4.16 (4), Arg 2.98 (3), His 1.5 (1), Asp 2.0 (2), Ser 3.4 (3), Glu 3.5 (3), Pro 3.2 (3), Gly 3.5 (3), Ala 1.6 (2), Val 3.2 (3), Met 1.1 (1), Tyr 2.1 (2), Phe 1.3 (1).

We claim:
1. A process for the preparation of human ACTH, which comprises reacting the protected tetradecapeptide tertiary butyloxycarbonyl-L-seryl - L - tyrosyl-L-seryl-L-methionyl-γ-tertiary butyl-L-glutamyl - L-histidyl-L-phenylalanyl-L-arginyl - L - tryptophyl-glycyl-ϵ-tertiary butyloxycarbonyl-L-lysyl - L - prolyl-L-valyl-glycine hydrochloride with a substantially equimolar amount of the protected pentacosapeptide ϵ-tertiary butyloxycarbonyl-L-lysyl -ϵ- tertiary butyloxycarbonyl - L - lysyl-L-arginyl-L-arginyl - L - prolyl-L-valyl-ϵ-tertiary butyloxycarbonyl-L-lysyl-L-valyl-O-tertiary butyl-L-tryrosyl - L - propyl-β-tertiary butyl-L-aspartyl-L-alanyl-glycyl-γ-tertiary butyl-L-glutamyl-β-tertiary butyl - L - aspartyl - L - glutaminyl-L-seryl-L-alanyl - γ - tertiary butyl-L-glutamyl-L-alanyl-L-phenylalanyl - L - propyl-L-leucyl-γ-tertiary butyl-L-glutamyl-L-phenylalanine tertiary butyl ester trihydrochloride at about room temperature and in the simultaneous presence of about one mole equivalent of triethyl amine, about two mole equivalents of dicyclohexyl-carbodiimide and about two to six mol equivalents of pentachlorophenol, and then splitting off by acidolysis with trifluoroacetic acid the protective groups of the obtained protected nonatriacontapeptide to obtain free human alpha$^{1-39}$-ACTH.

2. A process for the preparation of protected human ACTH, which comprises reacting the protected tetradecapeptide tertiary butyloxycarbonyl - L - seryl-L-tyrosyl-L-seryl - L - methionyl-γ-tertiary butyl-L-glutamyl-L-histidyl-L-phenylalanyl - L - arginyl-L-tryptophyl-glycyl-ϵ-tertiary butyloxycarbonyl-L-lysyl - L - prolyl-L-valyl-glycine hydrochloride with a substantially equimolar amount of the protected pentacosapeptide ϵ-tertiary butyloxycarbonyl-L-lysyl-ϵ tertiary butyloxycarbonyl - L - lysyl-L-arginyl-L-arginyl-L-prolyl - L - valyl-ϵ-tertiary butyloxycarbonyl-L-lysyl-L-valyl - O - tertiary butyl-L-tryrosyl-L-prolyl-β-tertiary butyl-L-aspartyl-L-alanyl-glycyl - γ - tertiary butyl-L-glutamyl - β - tertiary butyl-L-aspartyl-L-glutaminyl-L-seryl-L-alanyl - γ - tertiary butyl-L-glutamyl-L-alanyl-L-phenylalanyl-L-prolyl - L - leucyl-γ-tertiary butyl-L-glutamyl-L-phenylalanine tertiary butyl ester trihydrochloride at about room temperature and in the simultaneous presence of about one mol equivalent of triethyl amine, about two mol equivalents of dicyclohexyl-carbodiimide and about two to six mol equivalents of pentachlorophenol.

References Cited

UNITED STATES PATENTS

| 3,388,112 | 6/1968 | Geiger et al. | 260—112.5 |
| 3,243,423 | 3/1966 | Beyerman | 260—112.5 |
| 3,247,180 | 4/1966 | Schwyzer et al. | 260—112.5 |
| 3,345,354 | 10/1967 | Kappeler et al. | 260—112.5 |
| 3,503,951 | 3/1970 | Iselin et al. | 260—112.5 |

FOREIGN PATENTS

| 6510560 | 2/1966 | Netherlands | 260—112.5 |

OTHER REFERENCES

Schwyzer et al.: Helv. Chim. Acta 49, 134–158 (1966).
Kovacs et al.: J. Am. Chem. Soc. 88, 2282–2285 (1966).
Low et al.: Acta Chim. Hung. 44, 61–66 (1965).
Schroder et al.: The Peptides, vol. II, Academic Press, New York (1966), p. 195.
Bajusz et al.: Peptides, Beyerman et al. eds., North-Holland Publishing Co., Amsterdam (1967), pp. 209–213.
Bruckner et al.: Cited in Chem. Abst. 61, 719–720 (1964).

ELBERT L. ROBERTS, Primary Examiner

U.S. Cl. X.R.

424—177